US012731550B2

(12) United States Patent
Kim et al.

(10) Patent No.: US 12,731,550 B2
(45) Date of Patent: Sep. 8, 2026

(54) DISPLAY APPARATUS AND DRIVING METHOD THEREOF

(71) Applicant: LG Display Co., Ltd., Seoul (KR)

(72) Inventors: Young Ho Kim, Paju-si (KR); Jun Ho Yoo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/065,070

(22) Filed: Feb. 27, 2025

(65) Prior Publication Data

US 2025/0273167 A1 Aug. 28, 2025

(30) Foreign Application Priority Data

Feb. 27, 2024 (KR) ........................ 10-2024-0028102

(51) Int. Cl.
*G09G 3/3266* (2016.01)

(52) U.S. Cl.
CPC ... *G09G 3/3266* (2013.01); *G09G 2300/0819* (2013.01); *G09G 2310/0286* (2013.01); *G09G 2330/022* (2013.01)

(58) Field of Classification Search
CPC ......... G09G 3/3266; G09G 2300/0819; G09G 2310/0286; G09G 2330/022; G09G 2330/00
See application file for complete search history.

(56) References Cited

U.S. PATENT DOCUMENTS

2012/0249518 A1* 10/2012 Won ..................... H04N 13/356 345/213
2014/0092144 A1* 4/2014 Kim ..................... G09G 3/3291 345/76
2018/0197482 A1* 7/2018 Choi ..................... G09G 3/3266
2020/0118495 A1* 4/2020 Kang ..................... G09G 3/3648
2021/0193021 A1 6/2021 Yang et al.
2024/0127742 A1* 4/2024 Son ..................... G09G 3/3266

FOREIGN PATENT DOCUMENTS

KR 10-1806502 B1 12/2017
KR 10-2034057 B1 10/2019
KR 10-2021-0080996 A 7/2021
KR 10-2021-0081905 A 7/2021

* cited by examiner

*Primary Examiner* — Lixi C Simpson
(74) *Attorney, Agent, or Firm* — Morgan, Lewis & Bockius LLP

(57) ABSTRACT

In one or more examples, a display apparatus includes a display panel configured to display an image, a gate driver connected to gate lines of the display panel, and a driving circuit configured to control the gate driver. The gate driver simultaneously and sequentially initializes subpixels connected to gate lines of a first display area defined in the display panel and subpixels connected to gate lines of a second display area defined in the display panel. A driving method for a display apparatus is also disclosed.

16 Claims, 19 Drawing Sheets

AA1 and AA2 are initialized simultaneously

DISPLAY APPARATUS AND DRIVING METHOD THEREOF

CROSS-REFERENCE TO RELATED APPLICATIONS

This application claims the benefit of and priority to Korean Patent Application No. 10-2024-0028102 filed on Feb. 27, 2024, the entire contents of which are incorporated herein by reference for all purposes as if fully set forth herein.

BACKGROUND

1. Technical Field

The present disclosure relates to a display apparatus and a driving method thereof.

2. Description of the Related Art

As information technology advances, the market for display apparatuses which are connection mediums connecting a user to information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied to the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

The description of the related art should not be assumed to be prior art merely because it is mentioned in or associated with this section. The description of the related art includes information that describes one or more aspects of the subject technology, and the description in this section does not limit the invention.

SUMMARY

In one or more aspects, the present disclosure may provide a display apparatus and a driving method thereof, which may decrease a time taken in a power-on sequence and a power-off sequence to hasten a normal operation start time and a normal operation end time of an apparatus.

According to an embodiment, the present disclosure may provide a display apparatus including: a display panel configured to display an image; a gate driver connected to gate lines of the display panel; and a driving circuit configured to control the gate driver, wherein the gate driver may simultaneously and sequentially initialize subpixels connected to gate lines of a first display area defined in the display panel and subpixels connected to gate lines of a second display area defined in the display panel.

The gate driver may output a gate signal for simultaneously and sequentially initializing the gate lines of the first display area and the gate lines of the second display area during a power-on sequence when power is applied to the display apparatus.

The gate driver may output a gate signal for simultaneously and sequentially initializing the gate lines of the first display area and the gate lines of the second display area during a power-off sequence when supply of power to the display apparatus is cut off.

The display panel may include a first start signal line transferring a first start signal for starting an operation of the gate driver and a second start signal line transferring a second start signal.

The first start signal line may be connected to a start signal input terminal of a first stage included in a first shift register of the gate driver and a start signal input terminal of a first stage included in a second shift register of the gate driver, and the second start signal line may be connected to a start signal input terminal of an $M^{th}$ stage included in the first shift register of the gate driver and a start signal input terminal of an $M^{th}$ stage included in the second shift register of the gate driver, M being an integer larger than or equal to 2.

The first stage included in the first shift register of the gate driver and the first stage included in the second shift register of the gate driver may be disposed at one side and the other side respectively with respect to the first display area, and the $M^{th}$ stage included in the first shift register of the gate driver and the $M^{th}$ stage included in the second shift register of the gate driver may be disposed at one side and the other side respectively with respect to the second display area.

The first start signal and the second start signal may have the same phase during a power-on sequence when power is applied to the display apparatus and a power-off sequence when supply of power to the display apparatus is cut off.

The first start signal and the second start signal may have different phases during a display-on sequence when power is applied to the display panel.

Stages included in the first shift register and the second shift register may be implemented to have a dependent connection relationship so that an output of a next stage starts based on an output of a previous stage.

The stages included in the first shift register and the stages included in the second shift register may be connected to the same gate line for each stage and output the same gate signal.

The first start signal may be generated prior to the second start signal.

The $M^{th}$ stage included in the first shift register and the second shift register may output the $M^{th}$ gate signal after an $M^{th}-1$ gate signal is output from the $M^{th}-1$ stage included in the first shift register and the second shift register.

The first display area may be an upper display area corresponding to upper half of the display panel, and the second display area may be a lower display area corresponding to lower half of the display panel.

According to another embodiment, the present disclosure may provide a driving method for a display apparatus, the driving method including: outputting a gate signal for simultaneously and sequentially initializing gate lines of a first display area defined in a display panel and gate lines of a second display area defined in the display panel, during a power-on sequence when power is applied to the display apparatus; and sequentially applying a gate signal up to a last gate line of the second display area from a first gate line of the first display area during a display-on sequence when the power is applied to the display panel.

The driving method may further include outputting a gate signal for simultaneously and sequentially initializing the gate lines of the first display area and the gate lines of the second display area during a power-off sequence when supply of the power to the display apparatus is cut off.

A gate driver for outputting the gate signal may operate based on a first start signal and a second start signal having the same phase during the power-on sequence when the power is applied to the display apparatus and the power-off sequence when supply of the power to the display apparatus is cut off and may output the gate signal.

A gate driver for outputting the gate signal may operate based on a first start signal and a second start signal having different phases during the display-on sequence when the power is applied to the display panel and may output the gate signal.

In one or more aspects, the present disclosure may decrease a time taken in a power-on sequence and a power-off sequence to hasten a normal operation start time and a normal operation end time of an apparatus. In addition, in one or more aspects, the present disclosure may decrease a time taken in a power-on sequence and a power-off sequence, and thus, may secure a time needed for stable driving of the apparatus or a time needed for compensation of the apparatus.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the present disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure. In the drawings.

Figure 1:
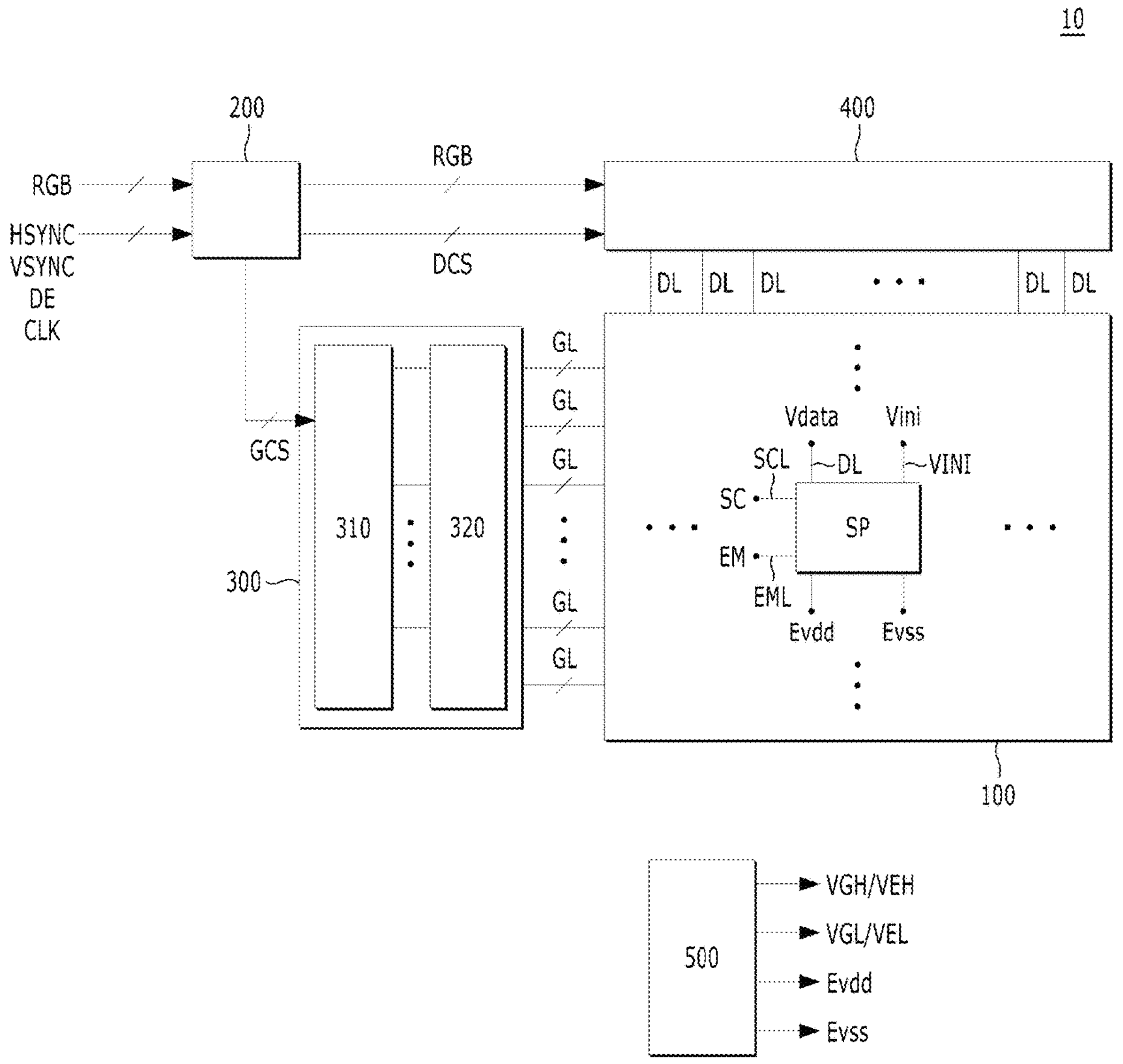
FIG. 1 is a block diagram schematically illustrating a display apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements (e.g., layers, films, components, electrodes, structures, transistors, regions, areas, portions, steps, operations, and/or the like), one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. For example, an element may be one or more elements. An element may include a plurality of elements. The word "exemplary" is used to mean serving as an example or illustration. Embodiments are example embodiments. An embodiment is an example embodiment. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

When a positional relationship between two elements (e.g., layers, films, components, electrodes, structures, transistors, regions, areas, portions, and/or the like) are described using any of the terms such as "on," "over," "under," "above," "upper," "below," "lower," "beneath," "near," "close to," "adjacent to," "beside," "next to," "at or on a side of," and/or the like indicating a position or location, one or more other elements may be located between the two elements unless a more limiting term, such as "immediate(ly)," "direct(ly)," or "close(ly)," is used. For example, when an element and another element are described using any of the foregoing terms, this description should be construed as including a case in which the elements contact each other directly as well as a case in which one or more additional elements are disposed or interposed therebetween. Furthermore, the spatially relative terms such as the foregoing terms as well as other terms such as "left," "right," "upper," "lower," "column," "row," "vertical," "horizontal," "diagonal," and the like refer to an arbitrary frame of reference. For example, these terms may be used for an example understanding of a relative relationship between elements, including any correlation as shown in the drawings. However, embodiments of the disclosure are not limited thereby or thereto. The spatially relative terms are to be understood as terms including different orientations of the elements in use or in operation in addition to the orientation depicted in the drawings or described herein. For example, where a lower element or an element positioned under another element is overturned, then the element may be termed as an upper element or an element positioned above another element. Thus, for example, the term "under" or "beneath" may encompass, in meaning, the term "above" or "over." An example term "below" or the like, can include all directions, including directions of "below," "above" and diagonal directions. Likewise, an example term "above," "on" or the like can include all directions, including directions of "above," "on," "below" and diagonal directions.

In describing a temporal relationship, when the temporal order is described as, for example, "after," "following," "subsequent," "next," "before," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., layers, films, components, electrodes, structures, transistors, regions, areas, portions, steps, operations, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

The expression that an element (e.g., layer, film, component, electrode, structure, transistor, section, member, part, region, area, portion, or the like) "is engaged" with another element may be understood, for example, as that the element may be either directly or indirectly engaged with the another element. The term "is engaged" or similar expressions may refer to a term such as "is in contact," "overlaps," "intersects," "is connected," "is coupled," "is combined," "is linked," "is provided," "is disposed," "interacts," or the like. The engagement may involve one or more intervening elements disposed or interposed between the element and the another element, unless otherwise specified. Further, the element may be engaged at least partially or entirely (or completely) with the another element, unless otherwise specified. Further, the element may be included in at least one of two or more elements that are engaged with each other. Similarly, the another element may be included in at least one of two or more elements that are engaged with each other. When the element is engaged with the another element, at least a portion of the element may be engaged with at least a portion of the another element. The term "with another element" or similar expressions may be understood as "another element," or "with, to, in, or on another element," as appropriate by the context. Similarly, the term "with each other" may be understood as "each other," or "with, to, or on each other," as appropriate by the context.

The phrase "through" may be understood, for example, to be at least partially through or entirely through.

The terms such as a "line" or "direction" should not be interpreted only based on a geometrical relationship in which the respective lines or directions are parallel, perpendicular, diagonal, or slanted with respect to each other, and may be meant as lines or directions having wider directivities within the range within which the components of the present disclosure may operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item. Further, at least one of a plurality of elements can represent (i) one element of the plurality of elements, (ii) some elements of the plurality of elements, or (iii) all elements of the plurality of elements. Further, "at least some," "at least some portions," "at least some parts," "at least a portion," "at least one or more portions," "at least a part," "at least one or more parts," "at least some elements," "one or more," or the like of a plurality of elements can represent (i) one element of the plurality of elements, (ii) a portion (or a part) of the plurality of elements, (iii) one or more portions (or parts) of the plurality of elements, (iv) multiple elements of the plurality of elements, or (v) all of the plurality of elements. Moreover, "at least some," "at least some portions," "at least some parts," "at least a portion," "at least one or more portions," "at least a part," "at least one or more parts," or the like of an element can represent (i) a portion (or a part) of the element, (ii) one or more portions (or parts) of the element, or (iii) the element, or all portions of the element.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element is referred to as being "between" at least two elements, the element may be the only element between the at least two elements, or one or more intervening elements may also be present.

In one or more aspects, the phrases "each other" and "one another" may be used interchangeably simply for convenience unless stated otherwise.

In one or more aspects, the phrases "one or more among" and "one or more of" may be used interchangeably simply for convenience unless stated otherwise. In one or more aspects, unless stated otherwise, the term "mth" may refer to "mnd" (e.g., 2nd where m is 2), or "mrd" (e.g., 3rd where m is 3), and m may be a natural number or a whole number.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in more detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for the convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

A display apparatus according to one or more aspects of the present disclosure may be implemented as a light emitting display apparatus or a quantum dot display (QDD) apparatus. Hereinafter, for convenience of description, a light emitting display apparatus self-emitting light based on an inorganic light emitting diode or an organic light emitting diode will be described for example.

Moreover, a thin film transistor (TFT) described below may be implemented with an n-type TFT, a p-type TFT, or a combination of an n-type TFT and a p-type TFT. A TFT may be a three-electrode element including a gate, a source, and a drain. The source may be an electrode which provides a carrier to a transistor. In the TFT, a carrier may start to flow from the source. The drain may be an electrode where the carrier flows from the TFT to the outside. That is, in the TFT, the carrier flows from the source to the drain.

In the p-type TFT, because a carrier is a hole, a source voltage may be higher than a drain voltage so that the hole flows from the source to the drain. In the p-type TFT, because the hole flows from the source to the drain, a current may flow from the source to the drain. On the other hand, in the n-type TFT, because a carrier is an electron, a source voltage may be lower than a drain voltage so that the electron flows from the source to the drain. In the n-type TFT, because the electron flows from the source to the drain, a current may flow from the drain to the source. However, a source and a drain of a TFT may switch therebetween based on a voltage applied thereto. Based thereon, in the following description, one of a source and a drain will be described as a first electrode, and the other of the source and the drain will be described as a second electrode.

FIG. 1 is a block diagram schematically illustrating a display apparatus 10 according to an embodiment of the present disclosure.

As illustrated in FIG. 1, the display apparatus 10 may include a display panel 100 which includes a plurality of subpixels SP, a controller 200, a gate driver 300 which supplies a gate signal to the plurality of subpixels SP, a data driver 400 which supplies a data signal (or a data voltage) to the plurality of subpixels SP, and a power supply 500 which supplies power to the plurality of subpixels SP.

The display panel 100 may include a display area (see AA of FIG. 2) where the plurality of subpixels SP are provided and a non-display area (see NA of FIG. 2) which is disposed to surround the display area AA and where the gate driver 300 and the data driver 400 are disposed.

In the display panel 100, a plurality of gate lines GL and a plurality of data lines DL may intersect with one another, and each of the plurality of subpixels SP may be connected to a gate line GL and a data line DL. In detail, one subpixel SP may be supplied with a gate signal from the gate driver 300 through the gate line GL, may be supplied with a data signal from the data driver 400 through the data line DL, and may be supplied with a high-level voltage Evdd and a low-level voltage Evss from the power supply 500.

The gate line GL may transfer a scan signal SC and an emission control signal EM to the plurality of subpixels SP, and the data line DL may transfer a data voltage Vdata to the plurality of subpixels SP. According to various embodiments, the gate line GL may include a plurality of scan lines SCL for supplying the scan signal SC and a plurality of emission control lines EML for supplying the emission control signal EM. The plurality of subpixels SP may be supplied with an initialization voltage Vini through an initialization voltage line VINI.

Each of the plurality of subpixels SP may include a subpixel driving circuit. The subpixel driving circuit may include a plurality of switching elements, a driving element, and a capacitor. The switching element and the driving element may each be configured as a TFT. A switching transistor may be turned on based on the scan signal SC supplied through the scan line SCL and the emission control signal EM supplied through the emission control line EML. A driving transistor may control the amount of current supplied to a light emitting device OLED to adjust the amount of emitted light, based on the data voltage Vdata.

The display panel 100 may be implemented as a non-transmissive display panel or a transmissive display panel. The transmissive display panel may be applied to a transparent display apparatus which displays an image on a screen thereof and enables a real thing of a background to be seen. The display panel 100 may be implemented as a flexible display panel. The flexible display panel may use a plastic substrate. Each of the plurality of subpixels SP may be divided into a red subpixel, a green subpixel, and a blue subpixel for color implementation. Each of the plurality of subpixels SP may further include a white subpixel.

Touch sensors may be disposed in the display panel 100. A touch input may be sensed by using separate touch sensors, or may be sensed through the plurality of subpixels SP. The touch sensors may be arranged as an on-cell type or an add-on type on a screen of the display panel 100, or may be implemented as in-cell type touch sensors embedded in the display panel 100.

The controller 200 may process image data RGB input from the outside to supply to the data driver 400, based on a size and a resolution of the display panel 100. The controller 200 may generate a gate control signal GCS and a data control signal DCS by using synchronization signals (for example, a dot clock signal CLK, a data enable signal DE, a horizontal synchronization signal HSYNC, and a vertical synchronization signal VSYNC) input from the outside. The controller 200 may supply the gate control signal GCS to the gate driver 300 to control an operation timing of the gate driver 300. The controller 200 may supply the data control signal DCS to the data driver 400 to control an operation timing of the data driver 400. The controller 200 may synchronize the operation timing of the gate driver 300 with the operation timing of the data driver 400 by using the gate control signal GCS and the data control signal DCS.

The controller 200 may be configured to be coupled to various processors (for example, a microprocessor, a mobile processor, and an application processor), based on a device mounted thereon. A host system disposed a previous end with respect to the controller 200 may be one of a television (TV) system, a set-top box, a navigation system, a personal computer (PC), a home theater system, a mobile device, a wearable device, and an automotive system.

The controller 200 may multiply an input frame frequency by i (where i may be a positive integer of more than 0) times to control an operation timing of the display panel driver, based on a frame frequency of an input frame frequency X i Hz. The input frame frequency may be about 60 Hz in national television standards committee (NTSC) scheme and may be about 50 Hz in phase-alternating line (PAL) scheme.

The controller 200 may drive the display panel 100 at various refresh rates. The controller 200 may drive the display panel 100 as a switchable form in a variable refresh rate (VRR) mode, namely, between a first refresh rate and a second refresh rate. For example, the controller 200 may simply change a speed of a clock signal, or may generate a synchronization signal so that a horizontal blank or a vertical blank occurs, or may drive the gate driver 300 in a mask mode, thereby driving the display panel 100 at various refresh rates.

A voltage level of the gate control signal GCS output from the controller 200 may be shifted to a gate on voltage VGL (VEL) and a gate off voltage VGH (VEH) by a level shifter (not shown) and may be supplied to the gate driver 300. The level shifter may shift a low-level voltage of the gate control signal GCS to a gate low voltage VGL and may shift a high-level voltage of the gate control signal GCS to a gate high voltage VGH. The gate control signal GCS may include a start signal and a clock signal.

The gate driver 300 may supply the gate signal to the gate line GL, based on the gate control signal GCS supplied from the controller 200. The gate driver 300 may be disposed at one side or both sides of the display panel 100 in a gate in panel (GIP) type.

The gate driver 300 may sequentially output the gate signal to the plurality of gate lines GL, based on control by the controller 200. The gate driver 300 may shift the gate signal by using a shift register, and thus, may sequentially supply the signals to the gate lines GL.

In an organic light emitting display apparatus, the gate signal may include the scan signal SC and the emission control signal EM. The scan signal SC may include a scan pulse which swings between a gate on voltage VGL and a gate off voltage VGH. The emission control signal EM may include an emission control signal pulse which swings between a gate on voltage VEL and a gate off voltage VEH. The scan pulse may select subpixels SP of a line in which a data voltage Vdata is to be written. The emission control signal EM may define an emission time of each of the subpixels SP.

The gate driver 300 may include an emission control signal driver 310 and one or more scan drivers 320. The emission control signal driver 310 may output the emission control signal pulse in response to a start signal and a clock signal from the controller 200 and may sequentially shift the emission control signal pulse according to the clock signal. The one or more scan drivers 320 may output the scan pulse in response to the start signal (or a start pulse) and the clock signal (or a shift clock) from the controller 200 and may shift the scan pulse, based on a clock signal timing.

The data driver 400 may convert the image data RGB into a data voltage Vdata, based on the data control signal DCS supplied from the controller 200, and may output the data voltage Vdata through the data line DL.

In FIG. 1, it is illustrated that the data driver 400 is disposed as one type at one side of the display panel 100, but the number and arrangement positions of data drivers 400 are not limited thereto. That is, the data driver 400 may be configured with a plurality of integrated circuits (ICs) and may be provided in plurality, and the plurality of data drivers 400 may be divided and arranged at one side of the display panel 100.

The power supply 500 may generate a direct current (DC) power needed for driving of the display panel driver and a subpixel array of the display panel 100 by using a DC-DC converter. The DC-DC converter may include a charge pump, a regulator, a buck converter, and a boost converter. The power supply 500 may receive a DC input voltage applied from the host system (not shown) to generate the gate on voltage VGL (VEL). The power supply 500 may generate DC voltages such as the gate off voltage VGH (VEH), the high-level voltage Evdd, and the low-level voltage Evss. The gate on voltage VGL (VEL) and the gate off voltage VGH (VEH) may be supplied to the level shifter (not shown) and the gate driver 300. The high-level voltage Evdd and the low-level voltage Evss may be supplied to the plurality of subpixels SP in common.

Figure 2:
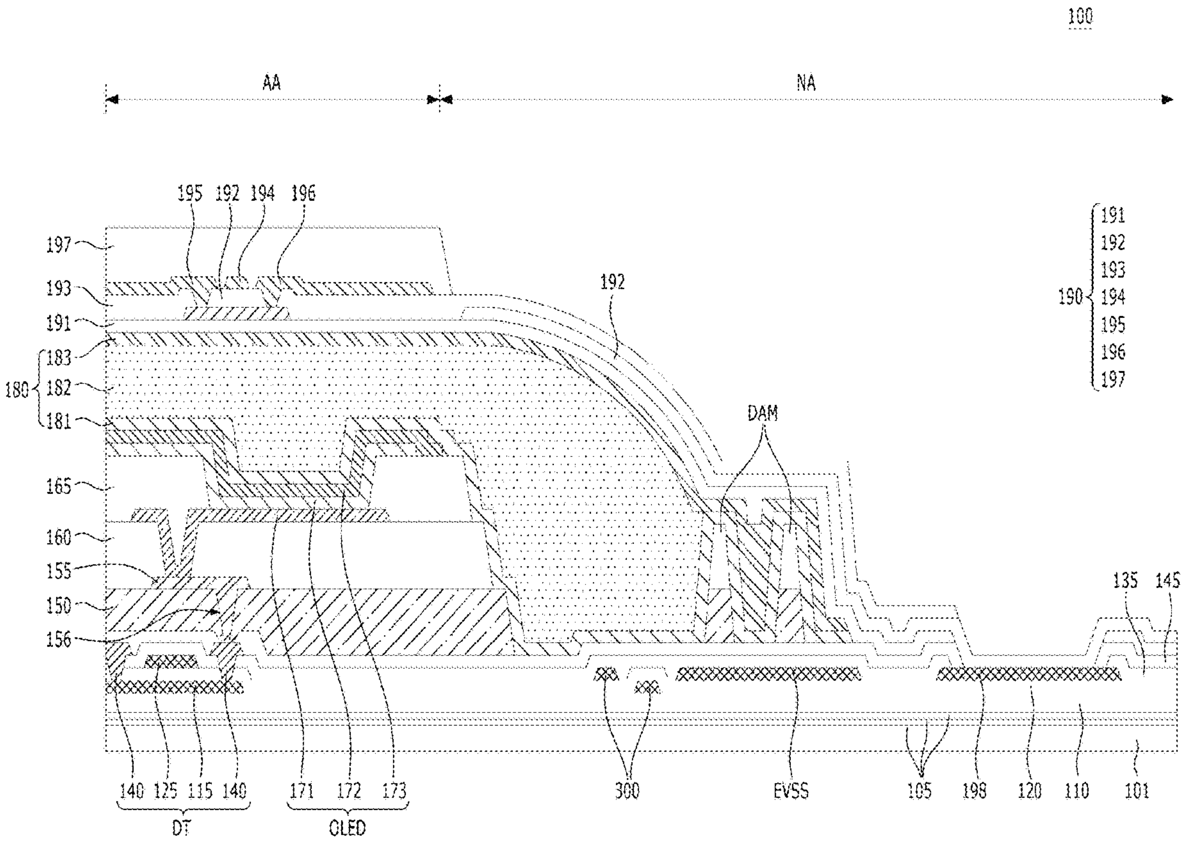
FIG. 2 is a cross-sectional view illustrating a stack form of a display panel according to an embodiment of the present disclosure.

FIG. 2 is a cross-sectional view illustrating a stack form of a display panel 100 according to an embodiment of the present disclosure.

As illustrated in FIG. 2, a driving transistor DT for driving a light emitting device OLED disposed in a display area AA may be disposed on a substrate 101 of the display panel 100. The driving transistor DT may include a semiconductor layer 115, a gate electrode 125, and a source and drain electrode 140. For convenience of description, only the driving transistor DT of various TFTs included in a subpixel driving circuit is illustrated, but other TFTs such as a switching transistor may be included in the subpixel driving circuit. Also, in the present disclosure, the driving transistor DT may be described as having a coplanar structure, but a TFT may be implemented in another structure such as a staggered structure. Accordingly, embodiments are not limited thereto.

At least a portion of the driving transistor DT and the switching transistor included in the subpixel driving circuit may use an oxide semiconductor as an active layer. A TFT which uses an oxide semiconductor material as the active layer may be good in leakage current cutoff effect and may be relatively lower in cost than a TFT which uses a polycrystalline semiconductor material as the active layer. Accordingly, in order to decrease power consumption and reduce the manufacturing cost, the subpixel driving circuit may at least one switching transistor and the driving transistor DT using an oxide semiconductor material.

All TFTs configuring the subpixel driving circuit may be implemented with an oxide semiconductor material, or only some switching transistors may be implemented with an oxide semiconductor material. However, a TFT using an oxide semiconductor material may be difficult to secure reliability, and a TFT using a polycrystalline semiconductor material may be high in speed and good in reliability. Accordingly, an embodiment of the present disclosure may include all of a switching transistor using an oxide semiconductor material and a switching transistor using a polycrystalline semiconductor material.

In response to a data signal supplied to the gate electrode 125 of the driving transistor DT, the driving transistor DT may receive the high-level voltage Evdd to control a current supplied to the light emitting device OLED and may thus adjust the amount of light emitted from the light emitting device OLED, and moreover, may supply a constant current until a data signal of a next frame is supplied, based on a voltage charged into a storage capacitor (not shown), thereby allowing the light emitting device OLED to maintain the emission of light. A high-level voltage line may be formed in parallel with a data line.

The driving transistor DT may include a semiconductor layer 115 disposed on a first insulation layer 110, a gate electrode 125 overlapping the semiconductor layer 115 with a second insulation layer 120 therebetween, and a source and drain electrode 140 which is formed on a third insulation layer 135 and contacts the semiconductor layer 115.

The semiconductor layer 115 may be a region where a channel of the driving transistor DT is formed. The semiconductor layer 115 may include an oxide semiconductor, or may include various organic semiconductors such as amorphous silicon (a-Si), polycrystalline silicon (poly-Si), or pentacene, but an embodiment is not limited thereto. The semiconductor layer 115 may be formed on the first insulation layer 110. The semiconductor layer 115 may include a channel region, a source region, and a drain region. The channel region may overlap the gate electrode 125 with the first insulation layer 110 therebetween to form the channel region between the source electrode 140 and the drain electrode 140. The source region may be electrically connected to the source electrode 140 through a contact hole passing through the second insulation layer 120 and the third insulation layer 135. The drain region may be electrically connected to the drain electrode 140 through a contact hole passing through the second insulation layer 120 and the third insulation layer 135. A buffer layer 105 and the first insulation layer 110 may be disposed between the semiconductor layer 115 and the substrate 101. The buffer layer 105 may delay the diffusion of water and/or oxygen penetrating into the substrate 101. The first insulation layer 110 may protect the semiconductor layer 115 and may prevent various kinds of defects from occurring in the substrate 101.

An uppermost layer of the buffer layer 105 contacting the first insulation layer 110 may include a material having an etching characteristic which differs from that of each of the other layers of the buffer layer 105, the first insulation layer 110, the second insulation layer 120, and the third insulation layer 135. The uppermost layer of the buffer layer 105 contacting the first insulation layer 110 may include one of nitride silicon (SiNx) and oxide silicon (SiOx). The other layers of the buffer layer 105, the first insulation layer 110, the second insulation layer 120, and the third insulation layer 135 may include the other of SiNx and SiOx. For example, the uppermost layer of the buffer layer 105 contacting the first insulation layer 110 may include SiNx, and the other layers of the buffer layer 105, the first insulation layer 110, the second insulation layer 120, and the third insulation layer 135 may include SiOx, but an embodiment is not limited thereto.

The gate electrode 125 may be formed on the second insulation layer 120 and may overlap the channel region of the semiconductor layer 115 with the second insulation layer 120 therebetween. The gate electrode 125 may include a first conductive material which is a single layer or a multilayer including one of magnesium (Mg), molybdenum (Mo), aluminum (Al), chrome (Cr), gold (Au), titanium (Ti), nickel (Ni), neodymium (Nd), and copper (Cu), or an alloy thereof, but an embodiment is not limited thereto.

The source electrode 140 may be connected to the source region of the semiconductor layer 115 exposed through a contact hole passing through the second insulation layer 120 and the third insulation layer 135. The drain electrode 140 may face the source electrode 140 and may be connected to the drain region of the semiconductor layer 115 exposed through a contact hole passing through the second insulation layer 120 and the third insulation layer 135.

The source region and the drain region may be a region which is conductive by doping a Group 5 or 3 impurity ion (for example, phosphorus (P) or boron (B)) on an intrinsic polycrystalline semiconductor material at a certain concentration. The channel region may allow a polycrystalline semiconductor material or an oxide semiconductor material to maintain an intrinsic state and may provide a path through which an electron or a hole moves.

The source and drain electrode 140 may include a second conductive material which is a single layer or a multilayer including one of Mg, Mo, Al, Cr, Au, Ti, Ni, Nd, and Cu, or an alloy of two or more materials thereof, but an embodiment is not limited thereto.

A connection electrode 155 may be disposed between a first middle layer 150 and a second middle layer 160. The connection electrode 155 may be exposed through a connection electrode contact hole 156 passing through a protection layer 145 and the first middle layer 150. The connection electrode 155 may include a material which is low in resistivity, identical or similar to the drain electrode 140, but an embodiment is not limited thereto.

The light emitting device OLED including an emission layer 172 may be disposed on the second middle layer 160 and a bank layer 165. The light emitting device OLED may include an anode electrode 171, at least one emission layer 172 formed on the anode electrode 171, and a cathode electrode 173 formed on the emission layer 172.

The anode electrode 171 may be disposed on the first middle layer 150 through a contact hole passing through the second middle layer 160 and may be electrically connected to a portion of the connection electrode 155 exposed on the second middle layer 160.

The anode electrode 171 may be formed to be exposed by the bank layer 165. The bank layer 165 may include an opaque material (for example, black) so as to prevent optical interference between adjacent subpixels. In this case, the bank layer 165 may include a light blocking material including at least one of a color pigment, organic black, and carbon, but an embodiment is not limited thereto.

At least one emission layer 172 may be formed on the anode electrode 171 of an emission region provided by the bank layer 165. The at least one emission layer 172 may include a hole transport layer, a hole injection layer, a hole blocking layer, an emission layer 172, an electron injection layer, an electron blocking layer, and an electron transport layer on the anode electrode 171 and may be stacked and formed sequentially or in reverse order in an emission direction. Also, the emission layer 172 may include first and second emission stacks facing each other with a charge generating layer therebetween. In this case, one emission layer 172 of the first and second emission stacks may generate blue light, and the other emission layer 172 of the first and second emission stacks may generate yellow-green light, whereby white light may be generated through the first and second emission stacks. The white light generated by the emission stack may be incident on a color filter disposed on or under the emission layer 172, and thus, a color image may be implemented. As another example, each emission layer 172 may generate color light corresponding each pixel to implement a color image, without a separate color filter. For example, an emission layer 172 of a red subpixel may generate red light, an emission layer 172 of a green subpixel may generate green light, and an emission layer 172 of a blue subpixel may generate blue light. The cathode electrode 173 may be formed to be opposite to the anode electrode 171 with the emission layer 172 therebetween.

An encapsulation layer 180 may prevent the penetration of external water or oxygen into the light emitting device OLED. To this end, the encapsulation layer 180 may include at least one-layer inorganic encapsulation layer and at least one-layer organic encapsulation layer, but an embodiment is not limited thereto. In the present disclosure, a structure of the encapsulation layer 180 where the first encapsulation layer 181, the second encapsulation layer 182, and the third encapsulation layer 183 are sequentially stacked may be described for example.

The first encapsulation layer 181 may be formed on the substrate 101 where the cathode electrode 173 is formed. The third encapsulation layer 183 may be formed on the substrate 101 where the second encapsulation layer 182 is formed and may be formed to surround an upper surface, a lower surface, and a lateral surface of the second encapsulation layer 182 along with the first encapsulation layer 181. The first encapsulation layer 181 and the third encapsulation layer 183 may minimize or prevent the penetration of external water or oxygen into the light emitting device OLED. The first encapsulation layer 181 and the third encapsulation layer 183 may include an inorganic insulating material, which is capable of low temperature deposition, such as SiNx, SiOx, oxynitride silicon (SiON), or oxide aluminum ($Al_2O_3$). The first encapsulation layer 181 and the third encapsulation layer 183 may be deposited in a low temperature atmosphere, and thus, may prevent the damage of the light emitting device OLED vulnerable to a high temperature atmosphere when performing a deposition process of the first encapsulation layer 181 and the third encapsulation layer 183.

The second encapsulation layer 182 may perform a buffer function of decreasing a stress between layers caused by the bending of the display apparatus and may planarize a step height between layers. The second encapsulation layer 182 may be formed on the substrate 101 where the first encapsulation layer 181 is formed and may include acryl resin, epoxy resin, phenolic resin, polyamide resin, polyimide resin, or polyethylene, or a non-photosensitive organic insulating material such as silicon oxycarbon (SiOC), or a photosensitive organic insulating material such as photo acryl, but an embodiment is not limited thereto. In a case where the second encapsulation layer 182 is formed through an inkjet process, a dam DAM may be disposed to prevent the second encapsulation layer 182 from being diffused to an edge of the substrate 101. The dam DAM may be disposed closer to the edge of the substrate 101 than the second encapsulation layer 182. The dam DAM may prevent the second encapsulation layer 182 from being diffused to a pad region where a conductive pad disposed at an outermost portion of the substrate 101 is provided.

The dam DAM may be designed to prevent the diffusion of the second encapsulation layer 182, but in a case where the second encapsulation layer 182 is formed to flow over a height of the dam DAM in a process, the second encapsulation layer 182 which is an organic layer may be exposed at the outside, and due to this, water may penetrate into the light emitting device OLED. Accordingly, in order to solve such a problem, the dam DAM may be provided as eleven or more to overlap each other.

The dam DAM may be disposed on the protection layer 145 of a non-display area NA. Also, the dam DAM may be formed simultaneously with the first middle layer 150 and the second middle layer 160. A lower layer of the dam DAM may be formed together when forming the first middle layer 150, and an upper layer of the dam DAM may be formed together when forming the second middle layer 160, and thus, the dam DAM may be stacked and formed in a double structure. Accordingly, the dam DAM may include the same insulating material as that of the first middle layer 150 and the second middle layer 160, but an embodiment is not limited thereto.

The dam DAM may be formed to overlap a low-level voltage line EVSS. For example, the low-level voltage line EVSS may be formed in a lower layer of a region, where the dam DAM is disposed, of the non-display area NA.

The low-level voltage line EVSS and the gate driver 300 configured as a GIP type may be formed to surround an outer portion of the display panel 100, and the low-level voltage line EVSS may be disposed more outward than the gate driver 300. The gate driver 300 is simply illustrated in the drawings such as a plan view and a cross-sectional view, but is not limited thereto and may be configured in the same structure as that of the driving transistor DT of the display area AA.

The low-level voltage line EVSS may be disposed more outward than the gate driver 300 and may be disposed to surround the display area AA. The low-level voltage line EVSS may include the same material as that of the source and drain electrode 140 of the TFT, but an embodiment is not limited thereto. For example, the low-level voltage line EVSS may include the same material as that of the gate electrode 125. Also, the low-level voltage line EVSS may be electrically connected to the anode electrode 171. The low-level voltage line EVSS may supply the low-level voltage Evss to a plurality of pixels of the display area AA.

A touch layer 190 may be disposed on the encapsulation layer 180. In the touch layer 190, a touch buffer layer 191 may be disposed between the cathode electrode 173 of the light emitting device OLED and a touch sensor metal including touch electrodes 195 and 196 and touch electrode connection lines 192 and 194.

The touch buffer layer 191 may prevent external water or a chemical solution (for example, a developer or an etchant), which is used in a manufacturing process of the touch sensor metal disposed on the touch buffer layer 191, from penetrating into the emission layer 172 including an organic material. Accordingly, the touch buffer layer 191 may prevent the damage of the emission layer 172 vulnerable to the chemical solution or water.

The touch buffer layer 191 may include an organic insulating material which has a low dielectric constant of 1 to 3 and is capable of being formed at a low temperature of a certain temperature (for example, 100° C.) or less, so as to prevent the damage of the emission layer 172 including an organic material vulnerable to a high temperature. For example, the touch buffer layer 191 may include an acrylic material, an epoxy-based material, or a siloxane-based material. The touch buffer layer 191 which includes an organic insulating material and has planarization performance may prevent the damage of the encapsulation layer 180 caused by the bending of an organic light emitting display apparatus and the breakage of the touch sensor metal formed on the touch buffer layer 191.

According to a touch sensor structure based on a mutual capacitance, the touch electrodes 195 and 196 may be disposed on the touch buffer layer 191, and the touch electrodes 195 and 196 may be disposed to intersect with each other.

The touch electrode connection lines 192 and 194 may electrically connect the touch electrodes 195 and 196 with each other. The touch electrode connection lines 192 and 194 and the touch electrodes 195 and 196 may be disposed in different layers with the touch insulation layer 193 therebetween. The touch electrode connection lines 192 and 194 may be disposed to overlap the bank layer 165 and may prevent a reduction in aperture ratio.

Furthermore, in the touch electrodes 195 and 196, a portion of the touch electrode connection line 192 may pass through an upper portion and a lateral surface of the encapsulation layer 180 and an upper portion and a lateral surface of the dam DAM and may be electrically connected to a touch driving circuit (not shown) through a touch pad 198.

The touch pad 198 may include a first pad layer including the same layer and material as those of the gate electrode 125 of FIG. 2, a second pad layer including the same layer and material as those of the source and drain electrode 140, a third pad layer including the same layer and material as those of the touch electrode connection line 192, and a fourth pad layer including the same layer and material as those of the touch electrodes 195 and 196.

A portion of the touch electrode connection line 192 may be supplied with a touch driving signal from a touch driving circuit and may transfer the touch driving signal to the touch electrodes 195 and 196, or may transfer touch sensing signals of the touch electrodes 195 and 196 to the touch driving circuit.

A touch protection layer 197 may be disposed on the touch electrodes 195 and 196. In the drawings, the touch protection layer 197 is illustrated as being disposed on only the touch electrodes 195 and 196, but an embodiment is not limited thereto and the touch protection layer 197 may extend up to a previous portion or a next portion with respect to the dam DAM and may be disposed on the touch electrode connection line 192.

Moreover, a color filter (not shown) may be further disposed on the encapsulation layer 180, and the color filter may be disposed on the touch layer 190 or may be disposed between the encapsulation layer 180 and the touch layer 190.

Figure 3:
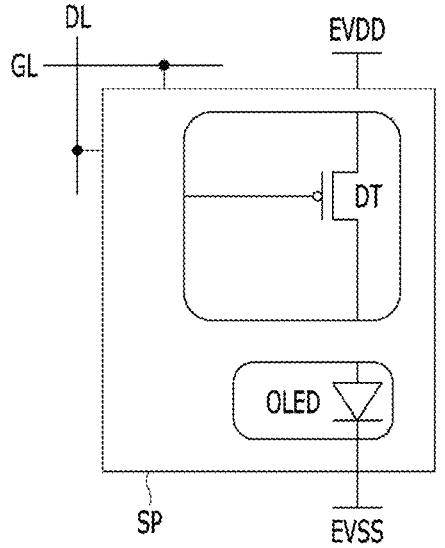
FIG. 3 is a diagram illustrating a portion of an element included in a subpixel according to a first embodiment.
Figure 4:
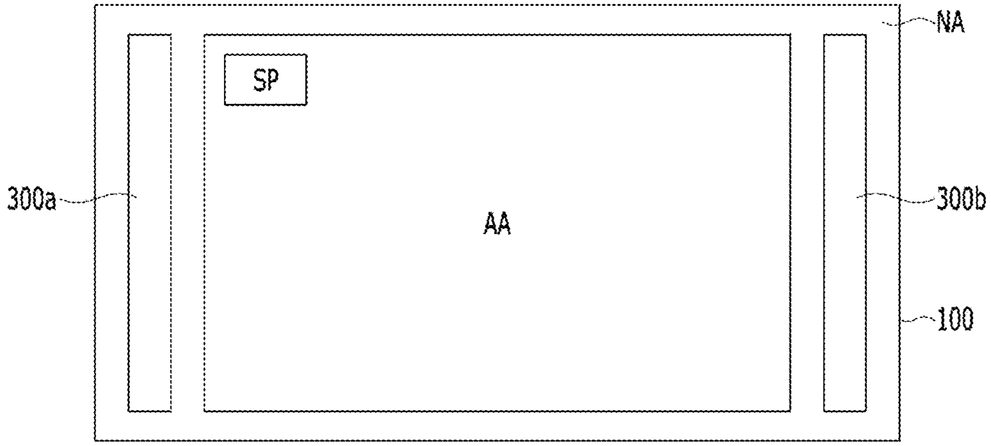
FIG. 4 is an example diagram illustrating a shift register included in a gate driver according to a first embodiment.
Figure 5:
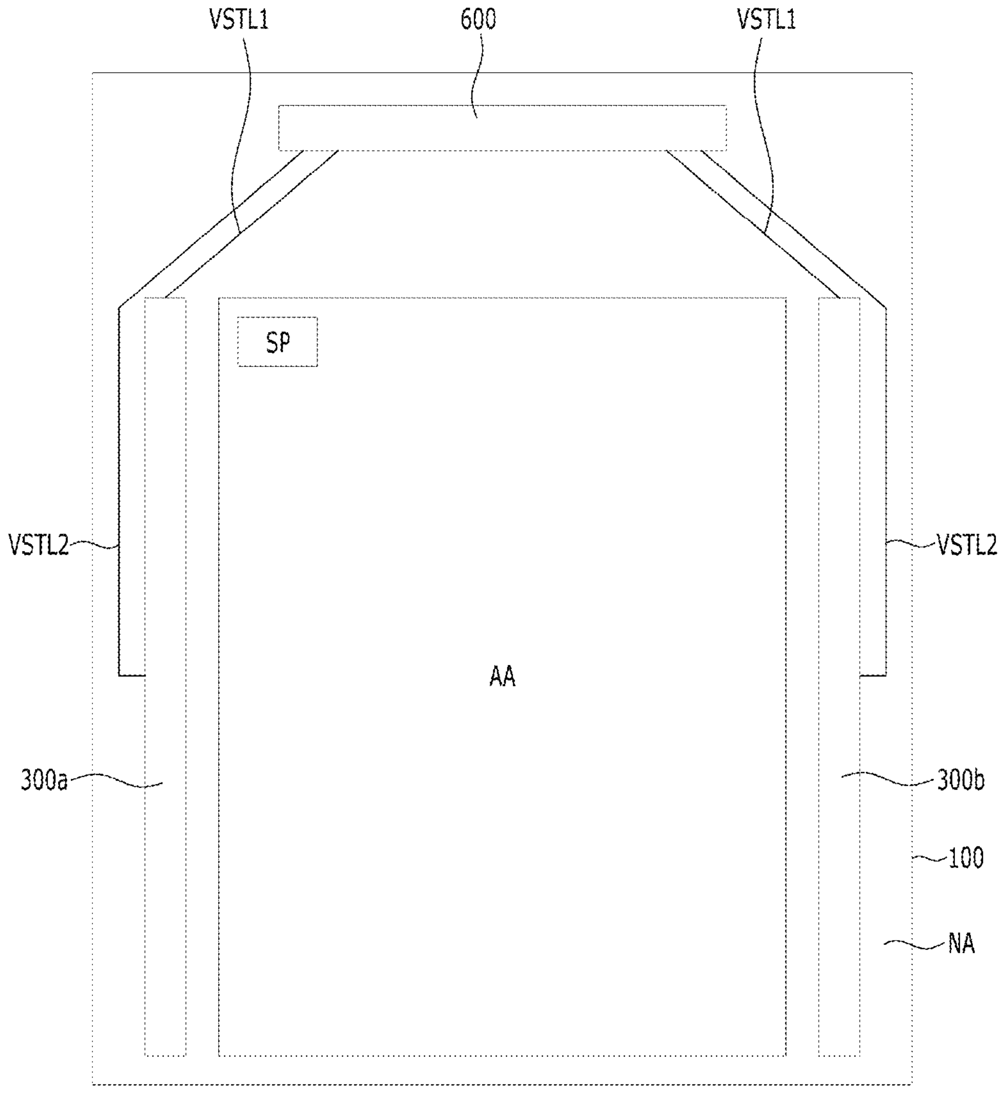
FIG. 5 is an example diagram illustrating an example where a multi start line is connected to a gate driver, according to a first embodiment.
Figure 6:
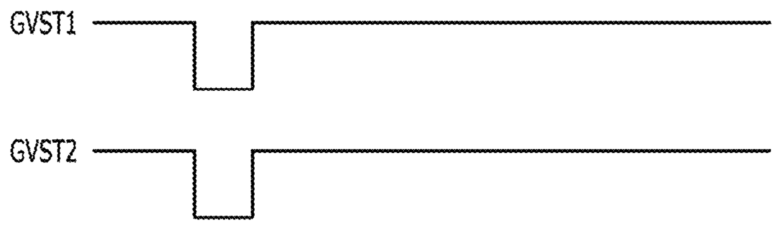
FIG. 6 is a waveform diagram illustrating a start signal applied through the multi start line of FIG. 5, according to a first embodiment.
Figure 7:
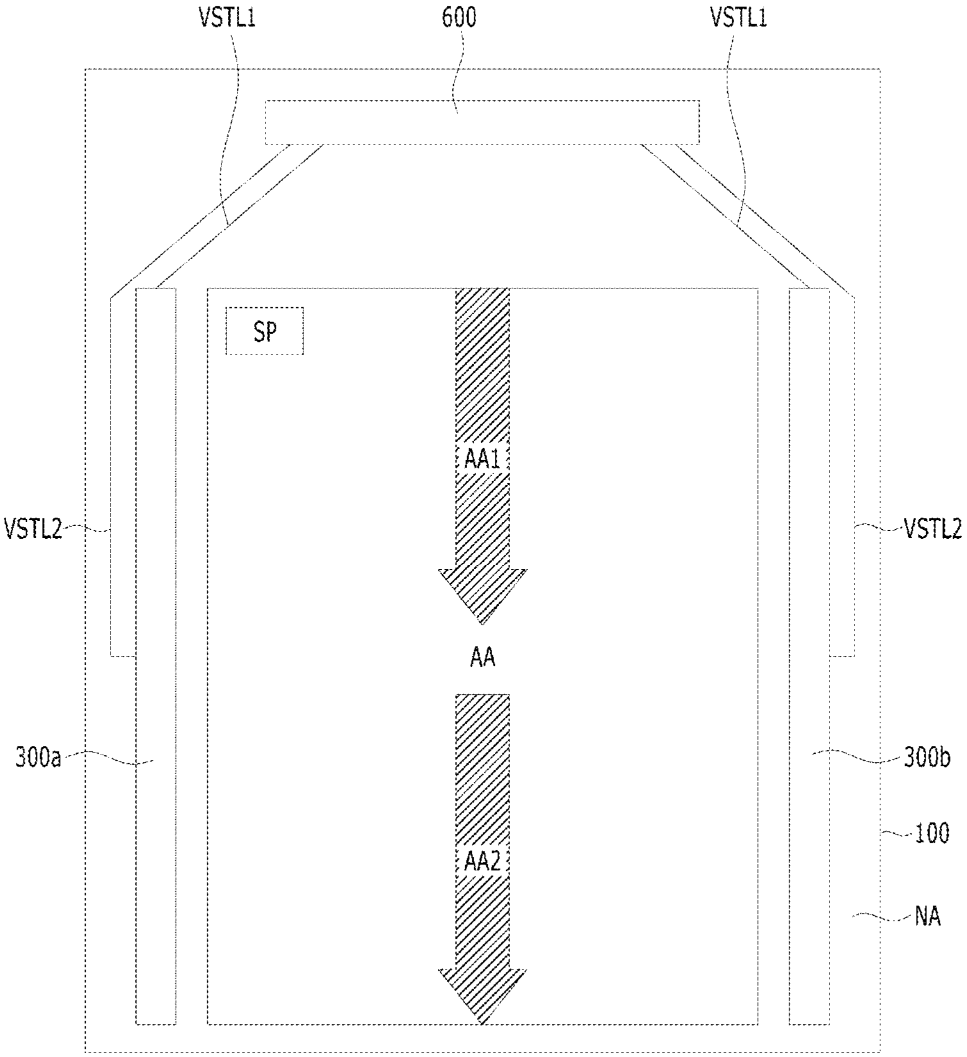
FIG. 7 is a diagram for describing a merit of a multi start signal application method according to a first embodiment.

FIG. 3 is a diagram illustrating a portion of an element included in a subpixel according to a first embodiment, FIG. 4 is an example diagram illustrating a shift register included in a gate driver according to a first embodiment, FIG. 5 is an example diagram illustrating an example where a multi start line is connected to a gate driver, according to a first embodiment, FIG. 6 is a waveform diagram illustrating a start signal applied through the multi start line of FIG. 5, according to a first embodiment, and FIG. 7 is a diagram for describing a merit of a multi start signal application method according to a first embodiment.

As illustrated in FIG. 3, a subpixel SP according to a first embodiment may include a driving transistor DT and a light emitting device OLED. The driving transistor DT may be implemented as a p type. The p-type driving transistor DT may operate in response to a low voltage. The light emitting device OLED may emit light with a driving current generated based on an operation of the driving transistor DT.

As illustrated in FIG. 4, the gate driver according to a first embodiment may include shift registers (for example, first and second shift registers **300*a* and 300*b*) which output a gate signal. The first and second shift registers 300*a* and 300*b* may be formed in a non-display area NA of a display panel 100, based on a GIP type (or a thin film process). For example, the first shift register 300*a* may be formed in one (left) non-display area NA of the display panel 100, and the second shift register 300*b* may be formed in the other (right) non-display area NA of the display panel 100**.

Furthermore, the arrangement of the shift registers may be merely an embodiment, and an embodiment is not limited thereto. For example, the shift registers may be formed in a display area AA of the display panel 100. In this case, elements configuring the shift registers may be distributed and disposed in a subpixel SP disposed in the display area AA.

Hereinafter, however, for convenience of description, an example where the shift registers are disposed in the non-display area NA of the display panel 100 will be described.

As illustrated in FIG. 5, the display panel 100 according to a first embodiment may include a panel driving circuit 600. The panel driving circuit 600 may be defined as an integrated circuit (IC) into which the controller 200 and the data driver 400 described above with reference to FIG. 1 are integrated. The panel driving circuit 600 may be mounted in an upper non-display area NA of the display panel 100. However, the controller 200 and the data driver 400 also may be separately disposed. The controller 200 and the panel driving circuit 600 may be referred as a driving circuit configured to control the gate driver 300.

The display panel 100 may include a first start signal line VSTL1 which transfers a first start signal for starting an operation of each of the first and second shift registers **300*a* and 300*b* and a second start signal line VSTL2 which transfers a second start signal. The first start signal line VSTL1 and the second start signal line VSTL2 may be connected to an output terminal of the panel driving circuit 600 and may be disposed in the non-display area NA of the display panel 100**.

The first start signal line VSTL1 may be connected to a start signal input terminal of a first stage included in the first shift register **300*a* and a start signal input terminal of a first stage included in the second shift register 300*b***.

The second start signal line VSTL2 may be connected to a start signal input terminal of an $M^{th}$ stage included in the first shift register **300*a* and a start signal input terminal of an $M^{th}$ stage included in the second shift register 300*b***. M may be an integer larger than or equal to 2.

As illustrated in FIG. 6, a first start signal GVST1 applied through the first start signal line VSTL1 and a second start signal GVST2 applied through the second start signal line VSTL2 may have the same form. That is, the first start signal GVST1 and the second start signal GVST2 may be generated by the panel driving circuit 600 to have the same phase.

As illustrated in FIGS. 5 to 7, according to a first embodiment, the first start signal GVST1 and the second start signal GVST2 having the same phase may be applied to the first stage included in the first shift register **300*a* and the second shift register 300*b* and the $M^{th}$ stage included in the first shift register 300*a* and the second shift register 300*b*** for the same time.

Therefore, the first stage included in the first shift register **300*a* and the second shift register 300*b* and the $M^{th}$ stage included in the first shift register 300*a* and the second shift register 300*b* may simultaneously perform an operation needed for initialization of the display panel 100**.

Furthermore, stages included in the first shift register **300*a* and the second shift register 300*b*** may be implemented to have a dependent connection relationship so that an output of a next stage starts based on an output of a previous stage.

Therefore, first to $M^{th}-1$ stages included in the first shift register **300*a* and the second shift register 300*b* may sequentially perform an operation needed for initialization of the display panel 100, and $M^{th}$ to $N^{th}$ stages included in the first shift register 300*a* and the second shift register 300*b* may sequentially perform the operation needed for initialization of the display panel 100**. N may be an integer larger than M.

The first to $M^{th}-1$ stages included in the first shift register **300*a* and the second shift register 300*b* may drive an upper display area AA1 (a first display area) corresponding to upper half of the display panel 100, and the $M^{th}$ to $N^{th}$ stages included in the first shift register 300*a* and the second shift register 300*b* may drive a lower display area AA2 (a second display area) corresponding to lower half of the display panel 100**.

Accordingly, subpixels included in the upper display area AA1 of the display panel 100 and subpixels included in the lower display area AA2 may be simultaneously initialized in order in which a gate signal is output. Also, as in a first embodiment, by using a multi start signal, a power-on sequence or a power-off sequence of the display apparatus may be reduced. This will be described below.

Figure 8:
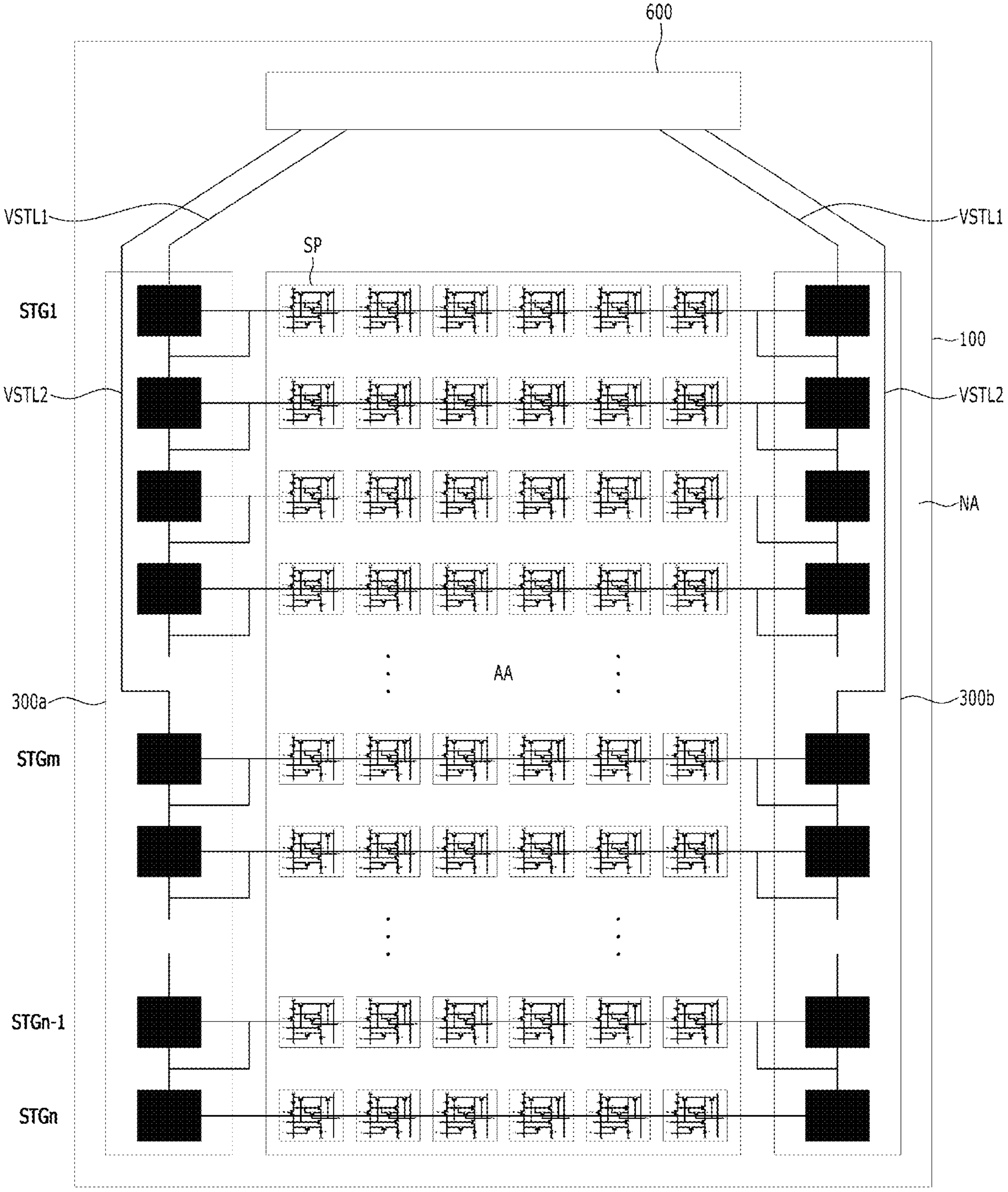
FIG. 8 is an example diagram illustrating a shift register included in a gate driver according to a second embodiment.
Figure 9:
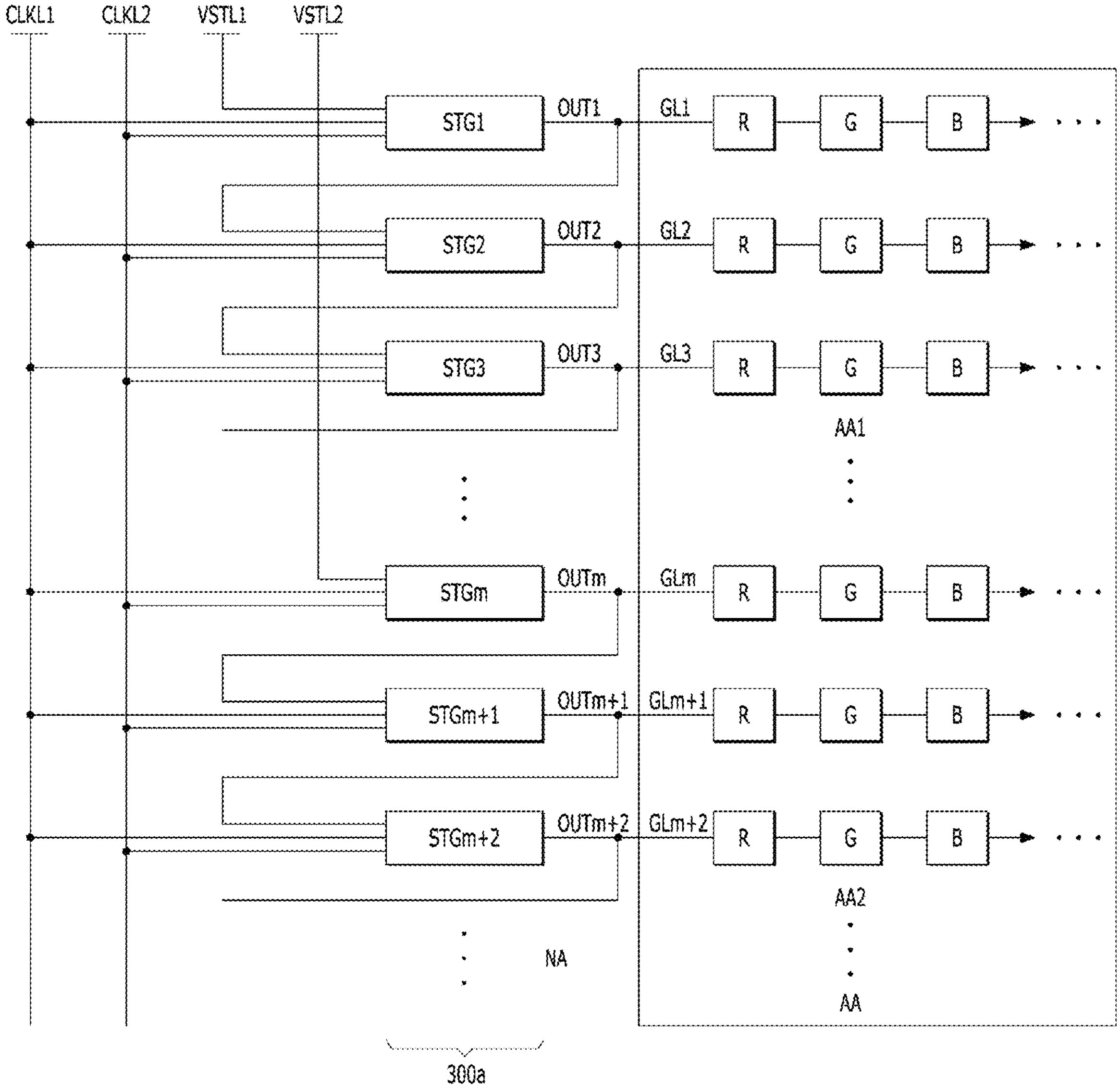
FIG. 9 is an example diagram illustrating in more detail a portion of FIG. 8 according to a second embodiment.
Figure 10:
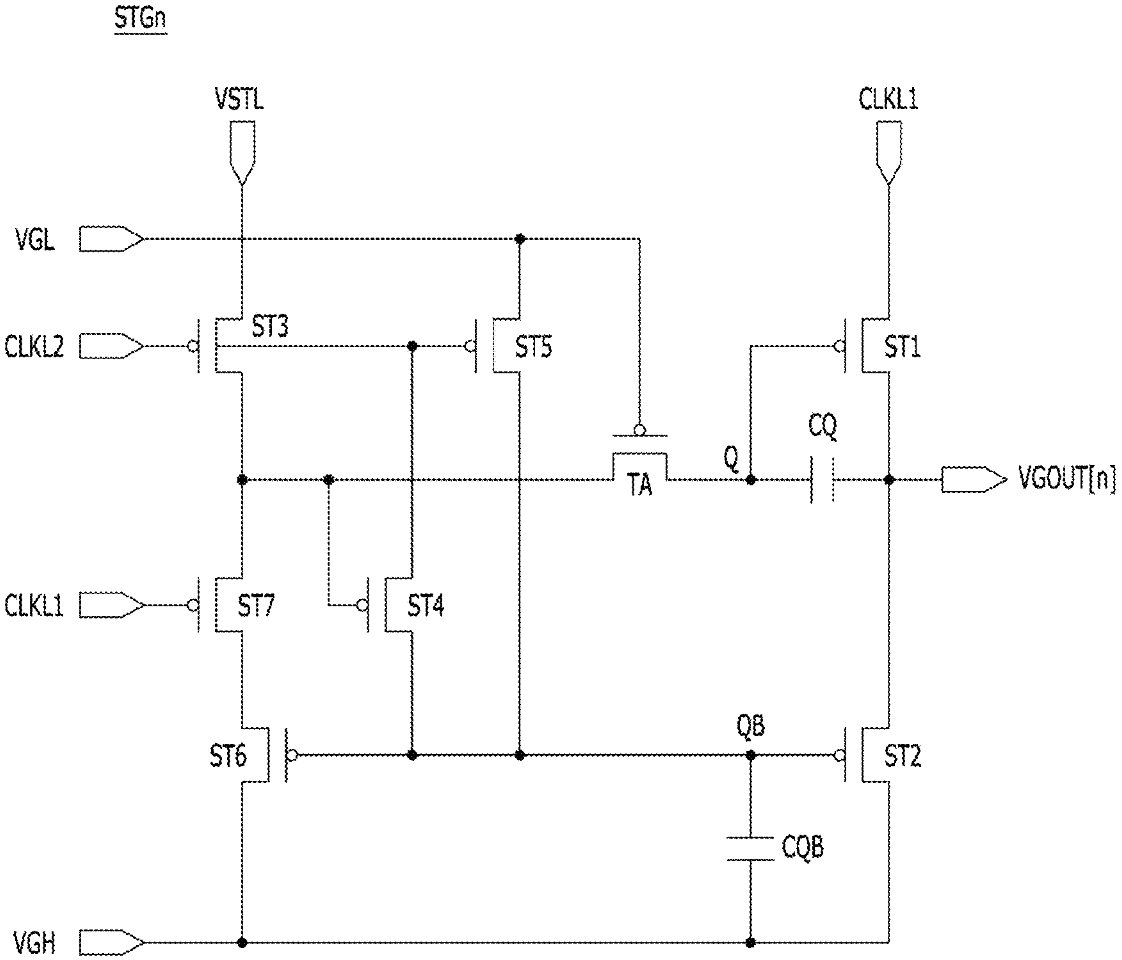
FIG. 10 is a circuit configuration diagram illustrating an arbitrary stage in FIG. 9 according to a second embodiment.
Figure 11:
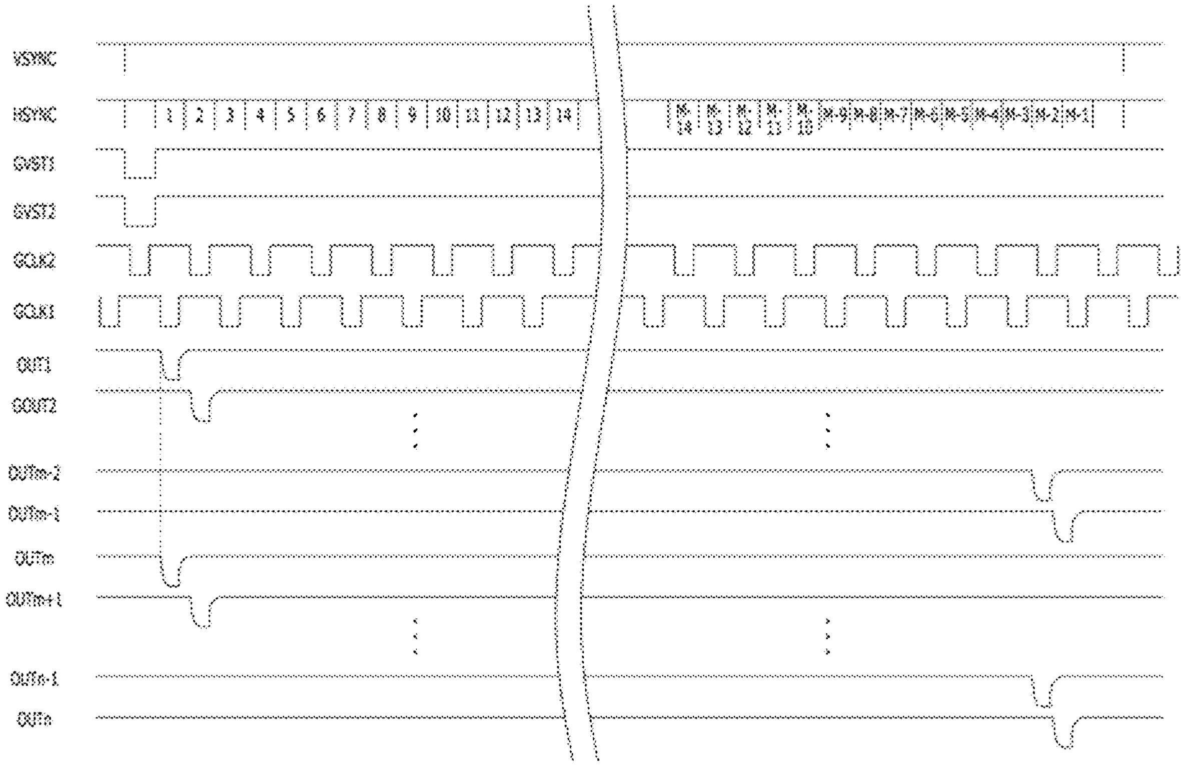
FIG. 11 is a waveform diagram used in a power-on (or power-off) sequence according to a second embodiment.
Figure 12:
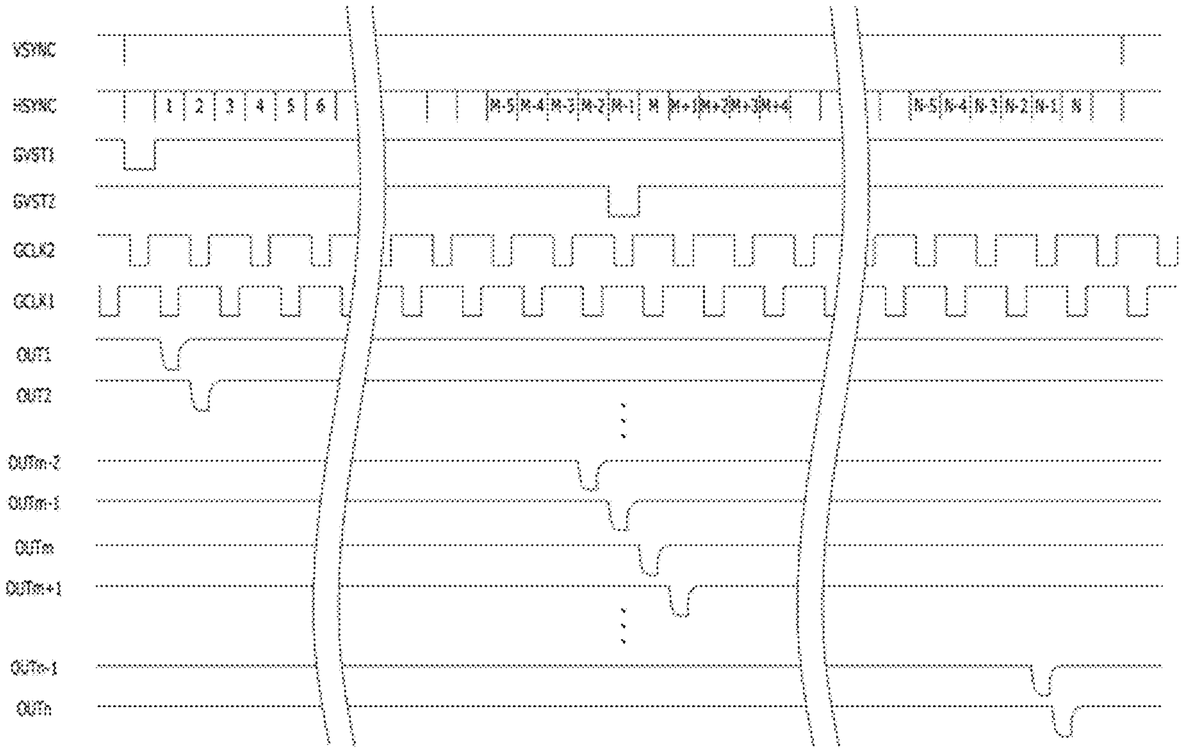
FIG. 12 is a waveform diagram used in a display-on sequence according to a second embodiment.

FIG. 8 is an example diagram illustrating a shift register included in a gate driver according to a second embodiment, FIG. 9 is an example diagram illustrating in more detail a portion of FIG. 8 according to a second embodiment, FIG. 10 is a circuit configuration diagram illustrating an arbitrary stage in FIG. 9 according to a second embodiment, FIG. 11 is a waveform diagram used in a power-on (or power-off) sequence according to a second embodiment, and FIG. 12 is a waveform diagram used in a display-on sequence according to a second embodiment.

As illustrated in FIGS. 8 and 9, a display panel 100 may include a first start signal line VSTL1 which transfers a first start signal and a second start signal line VSTL2 which transfers a second start signal. The first start signal line VSTL1 and the second start signal line VSTL2 may be connected to an output terminal of a panel driving circuit 600 and may be disposed in a non-display area NA of the display panel 100.

The first start signal line VSTL1 may be connected to a start signal input terminal of a first stage STG1 included in the first shift register 300*a* and a start signal input terminal of a first stage STG1 included in the second shift register 300*b*.

The second start signal line VSTL2 may be connected to a start signal input terminal of an $M^{th}$ stage STGm included in the first shift register 300*a* and a start signal input terminal of an $M^{th}$ stage STGm included in the second shift register 300*b*.

Stages STG1 to STGn included in the first shift register 300*a* and stages STG1 to STGn included in the second shift register 300*b* may be disposed to be horizontally symmetric. The stages STG1 to STGn included in the first shift register 300*a* and the stages STG1 to STGn included in the second shift register 300*b* may be connected to the same gate line for each stage and may output the same gate signal. For example, the first stage STG1 included in the first shift register 300*a* and the first stage STG1 included in the second shift register 300*b* may be connected to a first gate line GL1 and may output a first gate signal.

First to third stages STG1 to STG3 included in the first shift register 300*a* may be implemented to have a dependent connection relationship so that an output of a next stage starts based on an output of a previous stage. For example, a first gate signal OUT1 output from the first stage STG1 may be applied to a start signal input terminal of the second stage STG2, and a second gate signal OUT2 output from the second stage STG2 may be applied to a start signal input terminal of the third stage STG3. Although not shown in FIG. 9, first to third stages STG1 to STG3 of the second shift register 300*b* disposed to be opposite to the first to third stages STG1 to STG3 of the first shift register 300*a* may also be equal thereto.

$M^{th}$ to $M^{th}$+2 stages STGm to STGm+2 included in the first shift register 300*a* may be implemented to have a dependent connection relationship so that an output of a next stage starts based on an output of a previous stage. For example, an $M^{th}$ gate signal OUTm output from the $M^{th}$ stage STGm may be applied to a start signal input terminal of the $M^{th}$+1 stage STGm+1, and an $M^{th}$+1 gate signal OUTm+1 output from the $M^{th}$+1 stage STGm+1 may be applied to a start signal input terminal of the $M^{th}$+2 stage STGm+2. Although not shown in FIG. 9, $M^{th}$ to $M^{th}$+2 stages STGm to STGm+2 of the second shift register 300*b* disposed to be opposite to the $M^{th}$ to $M^{th}$+2 stages STGm to STGm+2 of the first shift register 300*a* may also be equal thereto.

Furthermore, in FIG. 9, it is illustrated that the first to $N^{th}$ stages STG1 to STGn included in the first shift register 300*a* operate based on a first clock signal applied through a first clock signal line CLKL1 and a second clock signal applied through a second clock signal line CLKL2, but an embodiment is not limited thereto.

As illustrated in FIG. 10, an arbitrary $N^{th}$ stage STGn included in the first shift register 300*a* may include first to seventh signal transistors ST1 to ST7, a first compensation transistor TA, a first capacitor CQ, and a second capacitor CQB. This may be applicable to any one of the stages STG1 to STGn included in the first shift register 300*a* and the second shift register 300*b* of FIG. 8. Also, in FIG. 10, for example, transistors included in the $N^{th}$ stage STGn may be implemented as a p type, but an embodiment is not limited thereto.

The first signal transistor ST1 and the second signal transistor ST2 may each be an output circuit which outputs a gate signal through an output terminal VGOUT[n] of the $N^{th}$ stage STGn. The first signal transistor ST1 and the second signal transistor ST2 may be turned on or off based on opposite charge/discharge operations (on or off operation) of a Q node Q and a QB node QB. For example, the first signal transistor ST1 may be turned on based on a voltage of the Q node Q and may output, as a gate signal of a first voltage (an on voltage), a first clock signal applied through the first clock signal line CLKL1. The second signal transistor ST2 may be turned on based on a voltage of the QB node QB and may output, as a gate signal of a second voltage (an off voltage), a gate high voltage applied through a gate high voltage line VGH.

The first capacitor CQ and the second capacitor CQB may perform bootstrapping for a smooth and stable output in an output operation of each of the first signal transistor ST1 and the second signal transistor ST2.

The third to seventh signal transistors T3 to T7 may each be a node control circuit which controls opposite charge/discharge operations of the Q node Q and the QB node QB. The third signal transistor ST3 may be turned on based on a second clock signal applied through the second clock signal line CLKL2 and may transfer a start signal, applied through a start signal line VSTL (a start signal input terminal), to the Q node Q.

The fourth signal transistor ST4 may be turned on based on the voltage of the Q node Q and may transfer a second clock signal, applied through the second clock signal line CLKL2, to the QB node QB. The fifth signal transistor ST5 may be turned on based on the second clock signal applied through the second clock signal line CLKL2 and may transfer a gate low voltage, applied through a gate low voltage line VGL, to the QB node QB.

The sixth signal transistor ST6 may be turned on based on a voltage of the QB node QB and may transfer a gate high voltage, applied through a gate high voltage line VGH, to the seventh signal transistor ST7. The seventh signal transistor ST7 may be turned on based on the first clock signal applied through the first clock signal line CLKL1 and may transfer a gate high voltage, transferred from the sixth signal transistor ST6, to the Q node Q.

The first compensation transistor TA may always maintain a turned-on state, based on the gate low voltage applied through the gate low voltage line VGL. The first compensation transistor TA may physically separate the Q node Q to minimize an adverse effect of an electric potential of one side on an electric potential of the other side.

In a case where the Q node Q is charged based on the start signal (or an output signal of a previous stage) applied through the start signal line VSTL (or a start signal input terminal), the $N^{th}$ stage STGn may output the gate signal of the first voltage (the on voltage) through an output terminal VGOUT[n]. However, a connection relationship and a configuration of a circuit included in the $N^{th}$ stage STGn may be merely for helping understand a stage configuring a shift register, but an embodiment is not limited thereto.

As illustrated in FIGS. 8, 10, and 11, a gate driver according to a second embodiment may operate based on the first start signal GVST1 and the second start signal GVST2 having the same phase during a power-on sequence (an operation period of the gate driver after power is applied to a light emitting display apparatus). The gate driver according to a second embodiment may also have the operation during a power-off sequence.

The first start signal GVST1 and the second start signal GVST2 having the same phase may be applied to the first stage included in the first shift register 300*a* and the second shift register 300*b* and the $M^{th}$ stage included in the first shift register 300*a* and the second shift register 300*b* for the same time.

Therefore, the first stage STG1 included in the first shift register 300*a* and the second shift register 300*b* and the $M^{th}$ stage STGm included in the first shift register 300*a* and the second shift register 300*b* may simultaneously output a first gate signal OUT1 and an $M^{th}$ gate signal OUTm.

As described above, the stages STG1 to STGm included in the first shift register 300*a* and the second shift register 300*b* may be implemented to have a dependent connection relationship so that an output of a next stage starts based on an output of a previous stage.

Accordingly, the first to $M^{th}$−1 stages STG1 to STGm−1 included in the first shift register 300*a* and the second shift register 300*b* may sequentially output gate signals OUT1 to OUTm−1, and $M^{th}$ to $N^{th}$ stages STGm to STGn included in the first shift register 300*a* and the second shift register 300*b* may sequentially output gate signals OUTm to OUTn.

In FIG. 11, for example, the first and second shift registers 300*a* and 300*b* may be implemented with the $N^{th}$ stage STGn of FIG. 10, and thus, it should be understood that the first and second shift registers 300*a* and 300*b* operate based on a first clock signal GCLK1 and a second clock signal GCLK2.

As illustrated in FIGS. 8, 10, and 12, the gate driver according to a second embodiment may operate based on the first start signal GVST1 and the second start signal GVST2 having different phases during a display-on sequence (an operation period of the gate driver after power is applied to the display panel).

The first start signal GVST1 may be generated prior to the second start signal GVST2 and may be applied to the first stage STG1 included in the first shift register 300*a* and the second shift register 300*b*. The second start signal GVST2 may be generated later than the first start signal GVST1 and may be applied to the $M^{th}$ stage STGm included in the first shift register 300*a* and the second shift register 300*b*.

Therefore, the first gate signal OUT1 may be sequentially output from the first stage STG1 included in the first shift register 300*a* and the second shift register 300*b*, and then, the $M^{th}$ gate signal OUTm may be sequentially output from the $M^{th}$ stage STGm included in the first shift register 300*a* and the second shift register 300*b*. Here, the $M^{th}$ stage STGm included in the first shift register 300*a* and the second shift register 300*b* may output the $M^{th}$ gate signal OUTm after an $M^{th}$−1 gate signal OUTm−1 is output from the $M^{th}$−1 stage included in the first shift register 300*a* and the second shift register 300*b*.

The gate driver according to a second embodiment may initialize a node of a subpixel or may initialize power, based on a sequence. This will be described below.

Figure 13:
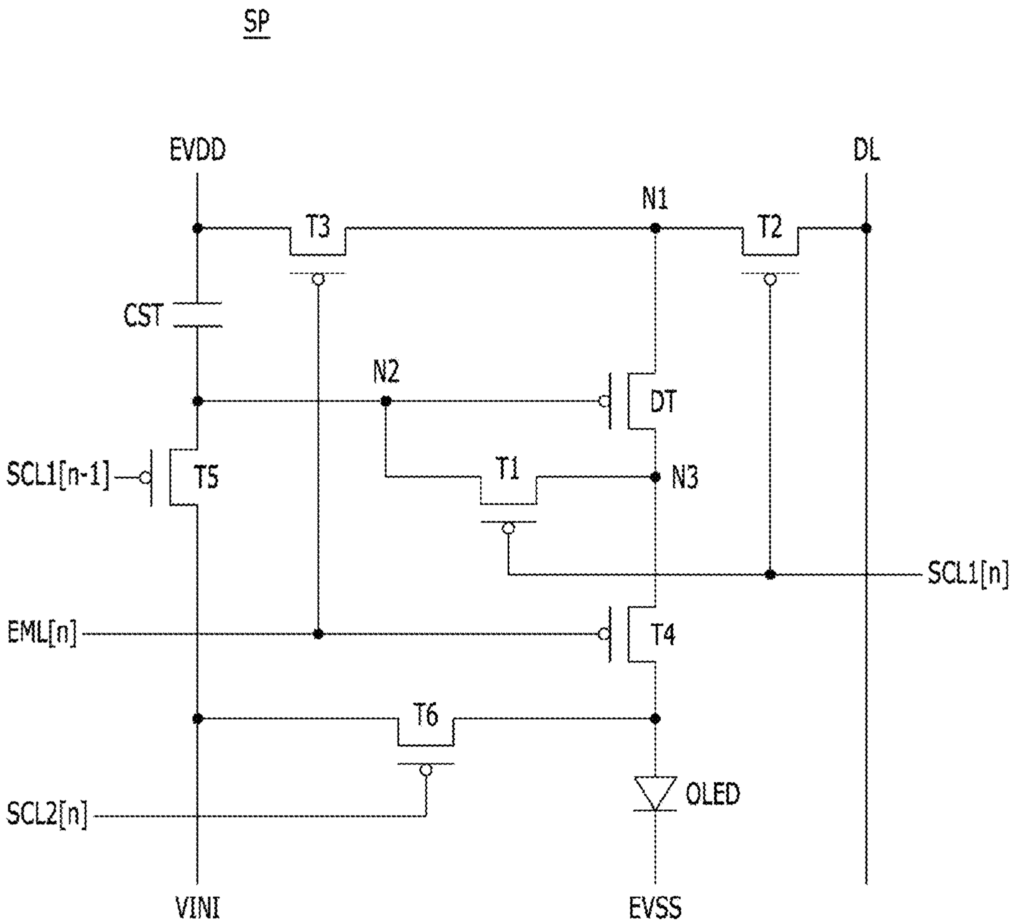
FIG. 13 is a circuit configuration diagram illustrating a subpixel capable of being driven based on a gate driver according to a second embodiment.
Figure 14:
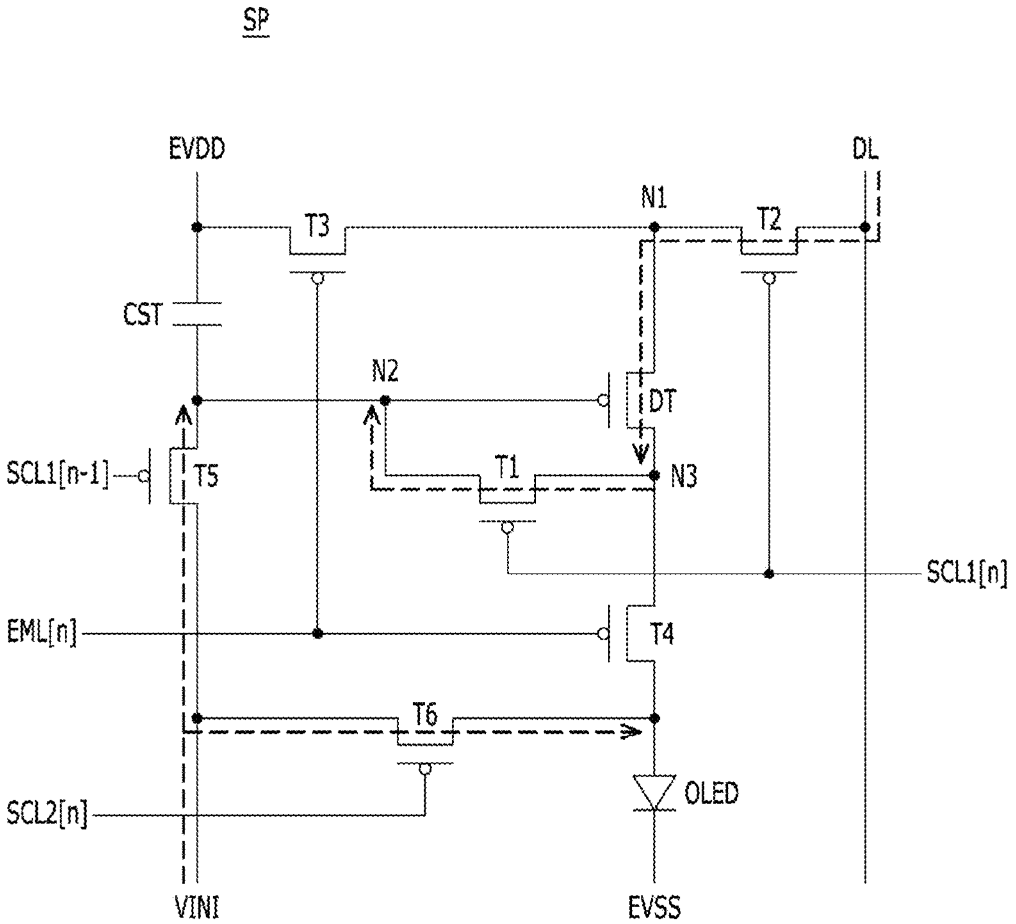
FIGS. 14 and 15 are diagrams illustrating an operating state of an operation performed in a node initialization process and a power initialization process of the subpixel illustrated in FIG. 13.
Figure 15:
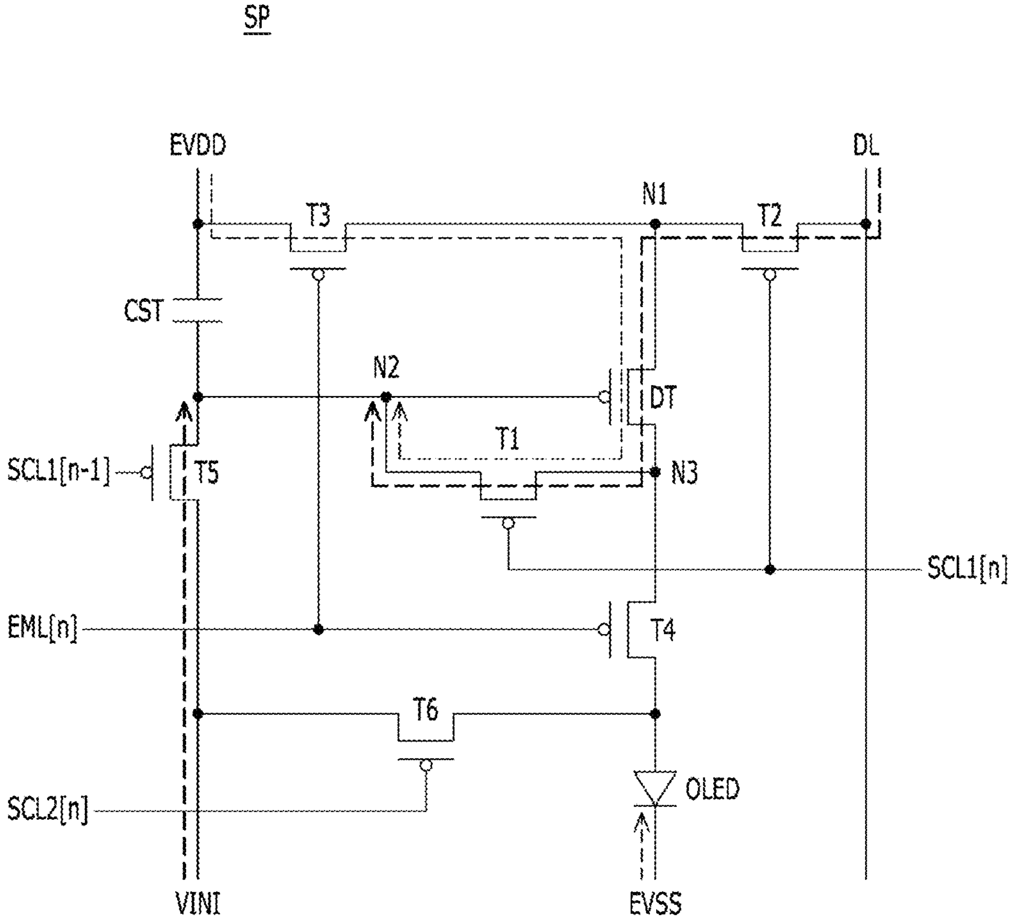
Figure 16:
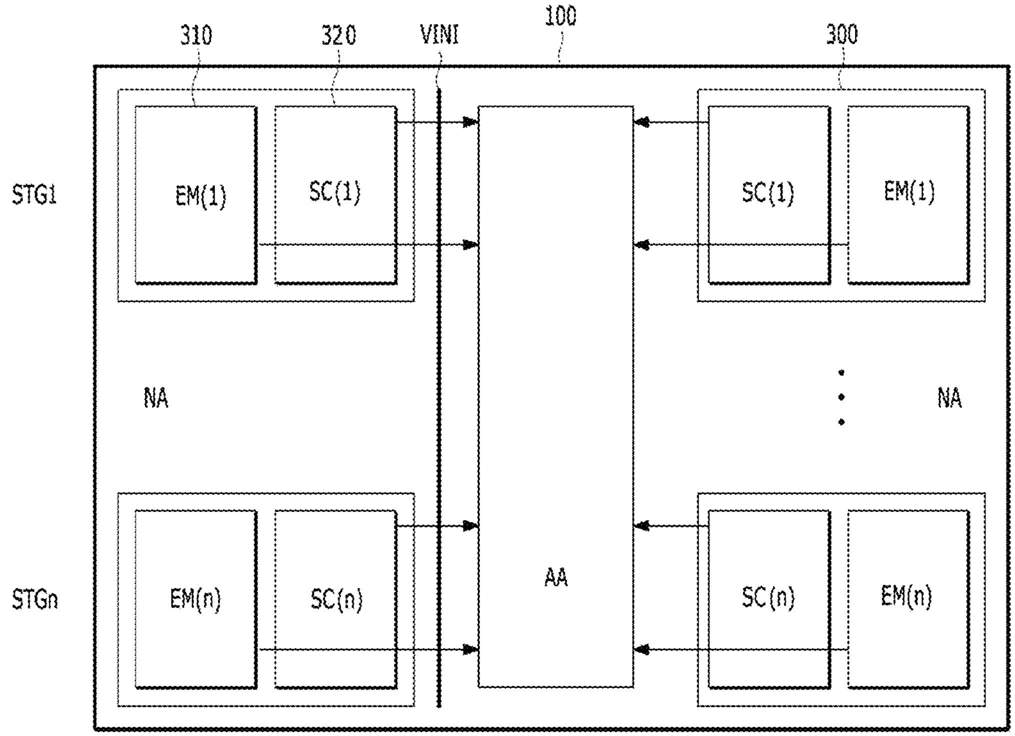
FIG. 16 is an example diagram illustrating a gate driver for driving a display panel implemented with the subpixel of FIG. 13.

FIG. 13 is a circuit configuration diagram illustrating a subpixel capable of being driven based on a gate driver according to a second embodiment, FIGS. 14 and 15 are diagrams illustrating an operating state of an operation performed in a node initialization process and a power initialization process of the subpixel illustrated in FIG. 13, and FIG. 16 is an example diagram illustrating a gate driver for driving a display panel implemented with the subpixel of FIG. 13.

As illustrated in FIG. 13, a subpixel SP according to a second embodiment may include first to sixth transistors T1 to T6, a driving transistor DT, and a light emitting device OLED. The first to sixth transistors T1 to T6 and the driving transistor DT may be implemented as a p type, but an embodiment is not limited thereto.

The first transistor T1 may include a gate electrode connected to a first scan line SCL1[n], a first electrode connected to a second node N2, and a second electrode connected to a third node N3. The first transistor T1 may be turned on in response to a first scan signal applied through the first scan line SCL1[n]. When the first transistor T1 is turned on, a threshold voltage of the driving transistor DT may be sampled.

The second transistor T2 may include a gate electrode connected to the first scan line SCL1[n], a first electrode connected to a data line DL, and a second electrode connected to a first node N1. The second transistor T2 may be turned on in response to the first scan signal applied through the first scan line SCL1[n]. When the second transistor T2 is turned on, a data voltage Vdata applied through the data line DL may be transferred to the first node N1.

The third transistor T3 may include a gate electrode connected to an emission control signal line EML[n], a first electrode connected to a high-level voltage line EVDD, and a second electrode connected to the first node N1. The third transistor T3 may be turned on in response to an emission control signal applied through the emission control signal line EML[n]. When the third transistor T3 is turned on, a high-level voltage applied through the high-level voltage line EVDD may be transferred to the first node N1.

The fourth transistor T4 may include a gate electrode connected to the emission control signal line EML[n], a first electrode connected to the third node N3, and a second electrode connected to an anode electrode of the light emitting device OLED. The fourth transistor T4 may be turned on in response to the emission control signal applied through the emission control signal line EML[n]. When the fourth transistor T4 is turned on, a driving current generated from the driving transistor DT may be transferred to the light emitting device OLED. When the fourth transistor T4 is turned on, the light emitting device OLED may emit light, based on the driving current generated from the driving transistor DT.

The fifth transistor T5 may include a gate electrode connected to an $N^{th}$−1 scan line SCL1[n−1], a first electrode connected to an initialization voltage line VINI, and a second electrode connected to the second node N2. The fifth transistor T5 may be turned on in response to an $N^{th}$−1 scan signal applied through the $N^{th}$−1 scan line SCL1[n−1]. When the fifth transistor T5 is turned on, an initialization voltage applied through the initialization voltage line VINI may be transferred to the second node N2. When the fifth transistor T5 is turned on, an electric charge remaining in a second electrode of a capacitor CST and the gate electrode of the driving transistor DT connected to the second node N2 may be initialized.

The sixth transistor T6 may include a gate electrode connected to a second scan line SCL2 [n], a first electrode connected to the initialization voltage line VINI, and a second electrode connected to the anode electrode of the light emitting device OLED. The sixth transistor T6 may be turned on in response to a second scan signal applied through the second scan line SCL2 [n]. When the sixth transistor T6 is turned on, the initialization voltage applied through the initialization voltage line VINI may be transferred to the anode electrode of the light emitting device OLED. When the sixth transistor T6 is turned on, an electric charge remaining in the anode electrode of the light emitting device OLED may be initialized.

The driving transistor DT may include a gate electrode connected to the second node N2, a first electrode connected to the first node N1, and a second electrode connected to the third node N3. The driving transistor DT may be driven based on the data voltage Vdata stored in the capacitor CST to generate the driving current.

The capacitor CST may include a first electrode connected to the high-level voltage line EVDD and the second electrode connected to the second node N2. The capacitor CST may store the data voltage Vdata during a certain period, and then, may transfer the data voltage Vdata to the gate electrode of the driving transistor DT.

The light emitting device OLED may include the anode electrode connected to the second electrode of the fourth transistor T4 and a cathode electrode connected to a low-level voltage line EVSS. The light emitting device OLED may emit light with the driving current transferred through the turned-on fourth transistor T4.

As illustrated in FIG. 14, the subpixel SP according to a second embodiment may primarily initialize the nodes N1 to N3, based on the initialization voltage and a black data defined as an internal power. As illustrated in FIG. 15, the subpixel SP according to a second embodiment may be secondarily initialized based on the high-level voltage and the low-level voltage in a primarily initialized state.

An operation (an initialization operation of the display panel) of initializing the subpixel SP may be performed by a gate driver and a data driver during a power-on sequence. A power-off sequence of ending the subpixel SP (an end of the display panel in a macroscopically view) may be performed to be opposite to the power-on sequence.

By using the gate driver according to a second embodiment, a display area of a display panel may be divided in half, and subpixels of a display area divided in half may be simultaneously and sequentially initialized, and thus, an initialization time may decrease to ½. However, this may be merely an embodiment, a display area of a display panel may be divided into more portions and when the number of start signal lines increases to N (where N may be an integer of 2 or more, for example, three or four) from two, the initialization time may decrease to 1/N (for example, ⅓ or ¼), based thereon.

As illustrated in FIG. 16, in a case where a display panel is implemented with the subpixel of FIG. 13, the gate driver 300 may include an emission control signal driver 310 and a scan driver 320. A shift register configuring the gate driver 300 may be configured to be disposed at both sides of the display area AA. However, the gate driver 300 may be modified based on a circuit configuration and a driving method of a subpixel disposed in the display area AA, and this should be understood as one embodiment.

Stages STG1 to STGn of the shift register may respectively include scan signal generators SC(1) to SC(n) and emission control signal generators EM(1) to EM(n). In FIG. 16, an $N^{th}$ stage STGn of the shift register is illustrated as a last stage. However, at least one dummy stage may be disposed in a previous stage with respect to the first stage STG1 of the shift register and a next stage with respect to the $N^{th}$ stage STGn of the shift register.

The scan signal generators SC(1) to SC(n) may output a scan signal through a scan line of the display panel 100. The emission control signal generators EM(1) to EM(n) may output an emission control signal through an emission control signal line of the display panel 100.

Furthermore, in FIG. 16, it is illustrated that only one initialization voltage line VINI is disposed at a left side of the display area AA, but an embodiment is not limited thereto and the initialization voltage line VINI may be disposed at both sides of the display area AA and may also be provided in plurality. Also, in FIG. 16, it is illustrated that the emission control signal generators EM(1) to EM(n) are disposed at both sides of the display area AA, but an embodiment is not limited thereto and the emission control signal generators EM(1) to EM(n) may be disposed at only one side of the display area AA.

Moreover, in FIGS. 5 to 12, an example has been described where the first start signal line VSTL1 and the second start signal line VSTL2 are divided and connected with respect to the scan driver 320 included in the gate driver. However, as seen in FIG. 16, a structure where start signal lines are divided and connected may be applied to the emission control signal driver 310 as well as the scan driver 320.

Figure 17:
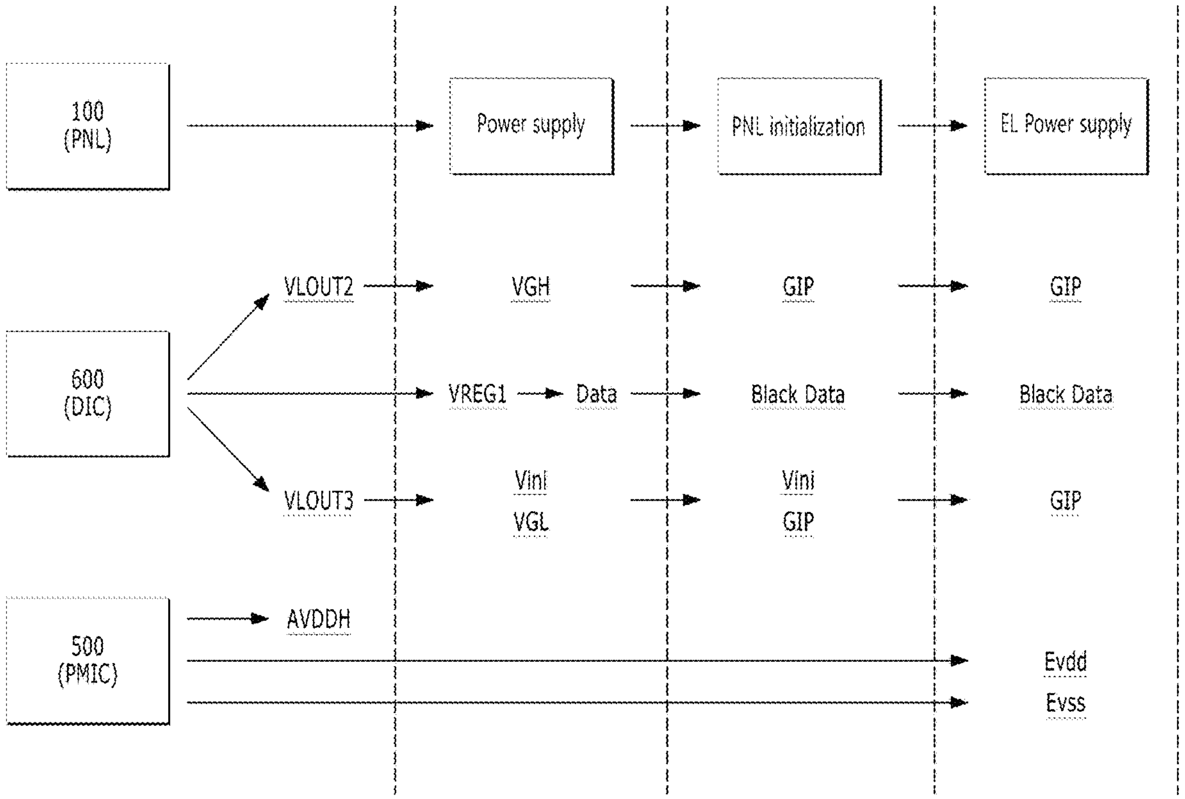
FIG. 17 is an example diagram for describing a portion associated with a power-on sequence.
Figure 18:
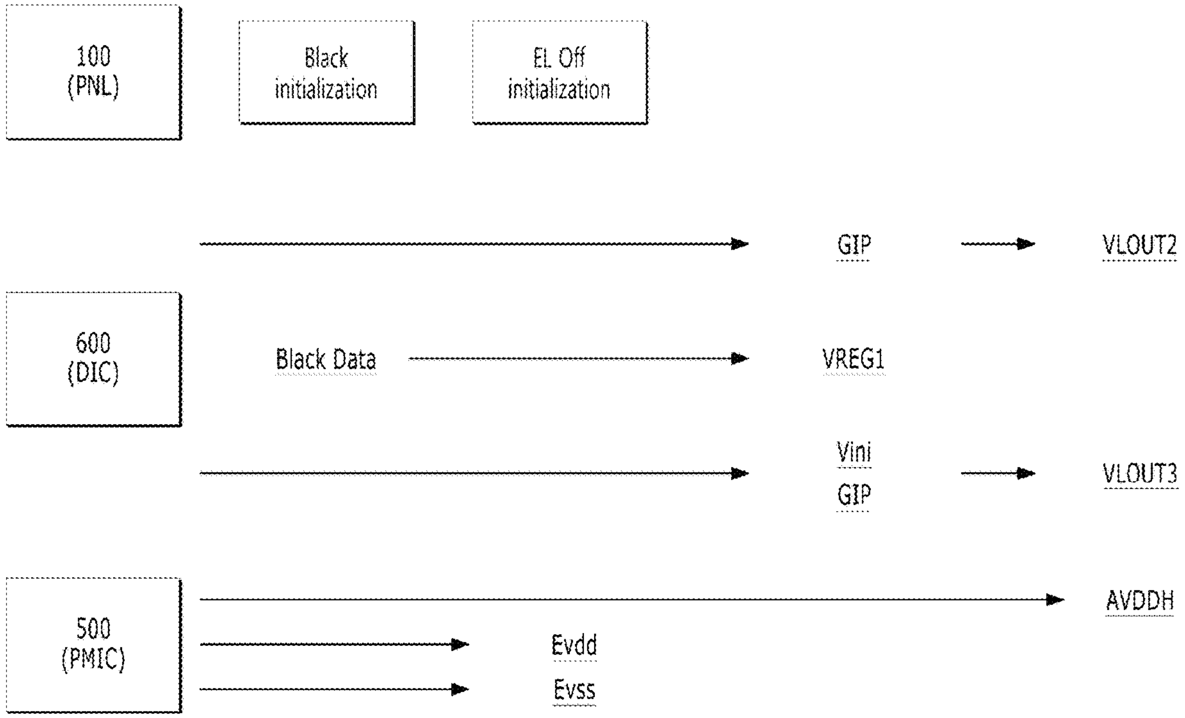
FIG. 18 is an example diagram for describing a portion associated with a power-off sequence.
Figure 19:
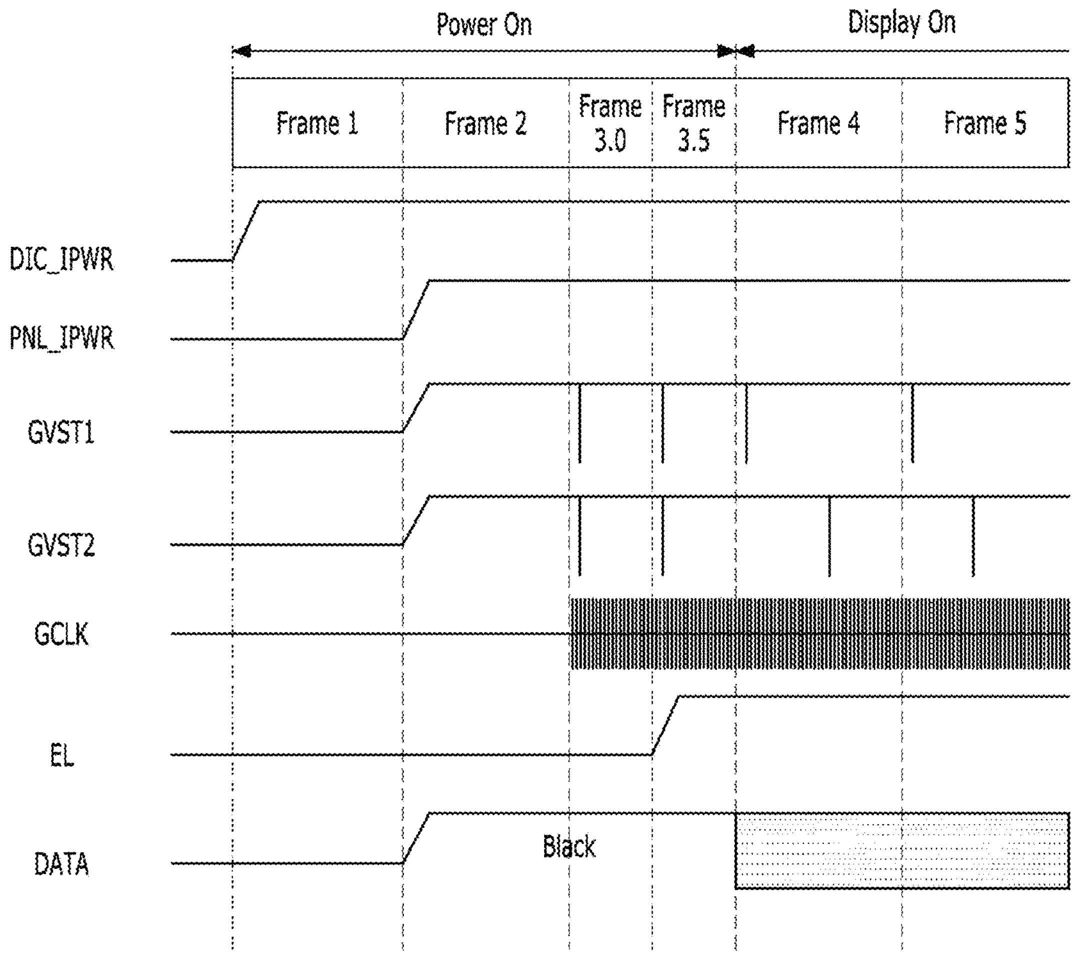
FIG. 19 is an example diagram for describing a variation of a power-on sequence and a display-on sequence used in a gate driver according to a second embodiment.
Figure 20:
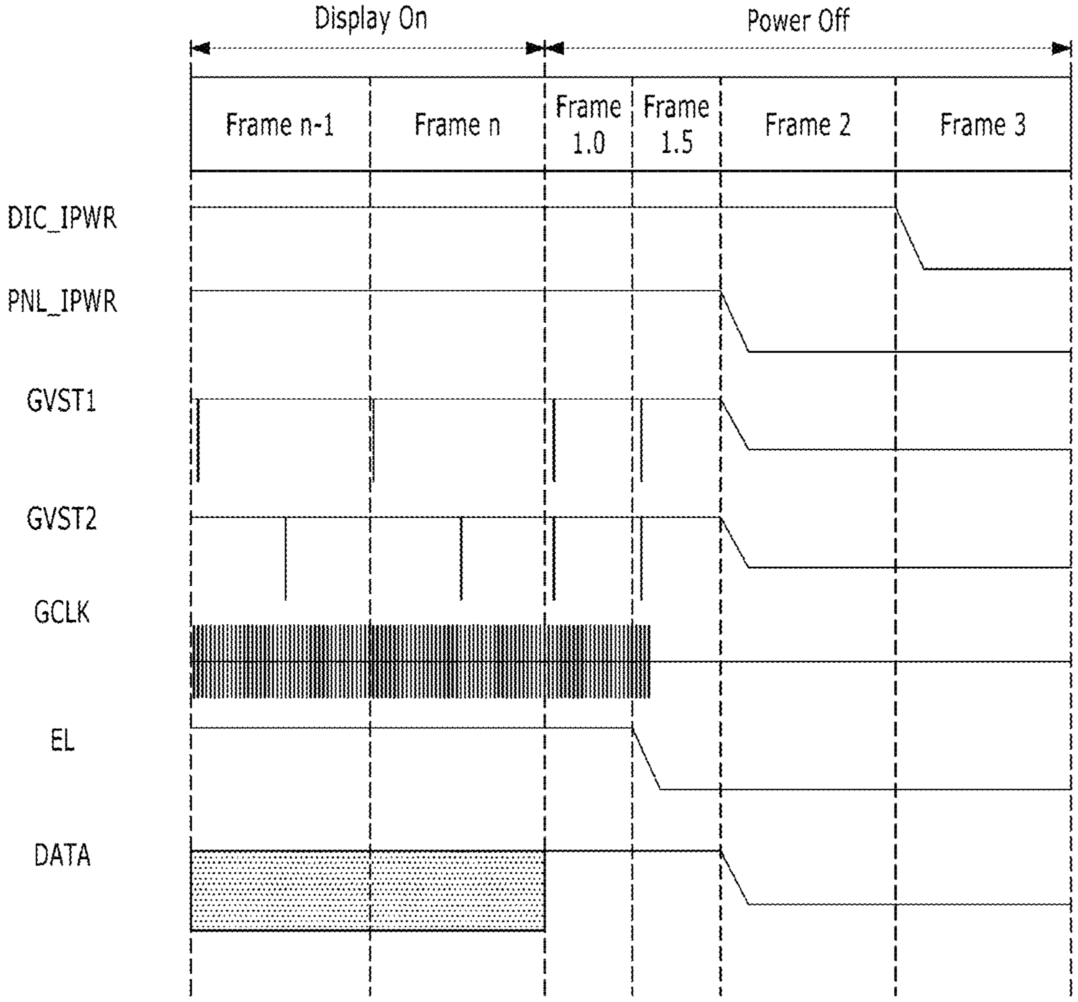
FIG. 20 is an example diagram for describing a variation of a display-on sequence and a power-off sequence used in a gate driver according to a second embodiment.

FIG. 17 is an example diagram for describing a portion associated with a power-on sequence, FIG. 18 is an example diagram for describing a portion associated with a power-off sequence, FIG. 19 is an example diagram for describing a variation of a power-on sequence and a display-on sequence used in a gate driver according to a second embodiment, and FIG. 20 is an example diagram for describing a variation of a display-on sequence and a power-off sequence used in a gate driver according to a second embodiment.

As illustrated in FIG. 17, a power-on sequence may be performed through different flows in each of a display panel (PNL) 100, a panel driving circuit (DIC) 600, and a power supply (PMIC) 500. For example, the power supply 500 may output a first voltage AVDDH. The panel driving circuit 600 may output a second voltage VLOUT2 and a third voltage VLOUT3 and may then output a register voltage VREG1 and a data voltage Data so that power is supplied to the display panel 100, and in a period similar/equal thereto, the panel driving circuit 600 may output a gate high voltage VGH, a gate low voltage VGL, and an initialization voltage Vini. Subsequently, the panel driving circuit 600 may output a gate driver voltage GIP, an initialization voltage Vini, and black data Black Data so that the display panel PNL is initialized. Subsequently, the power supply 500 may output a high-level voltage Evdd and a low-level voltage Evss according to an output of the black data Black Data and the gate driver voltage GIP, so that a power EL of the display panel PNL is supplied.

As illustrated in FIG. 18, a power-off sequence may be performed through different flows in each of the display panel (PNL) 100, the panel driving circuit (DIC) 600, and the power supply (PMIC) 500. For example, the panel driving circuit 600 may output the black data so that the display panel 100 is initialized (black initialized). Subsequently, the power supply 500 may cut off an output of the high-level voltage Evdd and the low-level voltage Evss so that the power (EL Off) of the display panel 100 is initialized. Accordingly, the gate driver voltage GIP, the register voltage VREG1, and the initialization voltage Vini output from the panel driving circuit 600 may be cut off, and then, an output of the first voltage AVDDH, the second voltage VLOUT2, and the third voltage VLOUT3 may be cut off.

However, the power-on sequence illustrated in FIG. 17, the power-off sequence illustrated in FIG. 18, and a voltage applied at the same time may be merely an embodiment for helping understand a sequence which may be performed when applying a power of a light emitting display apparatus, and an embodiment is not limited thereto.

As illustrated in FIGS. 19 and 20, by using the gate driver according to a second embodiment, a time for initializing a display panel may be reduced, and thus, a frame (for example, frame 3.0, frame 3.5) period taken in the power-on sequence and a frame (for example, frame 1.0, frame 1.5) period taken in the power-off sequence may decrease. For example, in the related art, a power-on time and a power-off time where two frames are consumed may decrease by one frame (decrease by ½ frame in a power-on/off sequence).

This is because the gate driver according to a second embodiment may not output gate signals for sequentially initializing first to last gate lines and may output gate signals for simultaneously and sequentially initializing gate lines of an upper display area and gate lines of a lower display area.

Furthermore, FIGS. 19 and 20 may be merely for showing that a time taken in a power-on sequence and a power-off sequence is reduced by using the gate driver according to a second embodiment, but an embodiment is not limited thereto. Also, in FIGS. 19 and 20, DIC_IPWR may denote an internal power of a data driver, PNL_IPWR may denote an internal power of a display panel, GVST1 and GVST2 may respectively denote a first start signal and a second start signal, GCLK may denote a clock signal, EL may denote a power of a display panel, and DATA may denote a data signal.

Hereinabove, in one or more aspects, the present disclosure may decrease a time taken in a power-on sequence and a power-off sequence to hasten a normal operation start time and a normal operation end time of an apparatus. In addition, in one or more aspects, the present disclosure may decrease a time taken in a power-on sequence and a power-off sequence, and thus, may secure a time needed for stable driving of the apparatus or a time needed for compensation of the apparatus.

The effects according to one or more aspects of the present disclosure are not limited to the above examples, and other various effects may be included in the specification.

While the present disclosure has been particularly shown and described with reference to example embodiments thereof, it will be understood by those of ordinary skill in the art that various changes in form and details may be made therein without departing from the spirit and scope of the present disclosure as defined by the following claims, including their equivalents.

What is claimed is:

1. A display apparatus, comprising:

a display panel configured to display an image;

a gate driver connected to gate lines of the display panel; and a driving circuit configured to control the gate driver, wherein the gate driver is configured to simultaneously and sequentially initialize subpixels connected to gate lines of a first display area defined in the display panel and subpixels connected to gate lines of a second display area defined in the display panel, wherein the display panel comprises a first start signal line transferring a first start signal for starting an operation of the gate driver and a second start signal line transferring a second start signal, and wherein the first start signal and the second start signal have a same phase during a power-on sequence when power is applied to the display apparatus.

2. The display apparatus of claim 1, wherein the gate driver is configured to output a gate signal for simultaneously and sequentially initializing the gate lines of the first display area and the gate lines of the second display area during the power-on sequence.

3. The display apparatus of claim 1, wherein the gate driver is configured to output a gate signal for simultaneously and sequentially initializing the gate lines of the first display area and the gate lines of the second display area during a power-off sequence when supply of power to the display apparatus is cut off.

4. The display apparatus of claim 1, wherein the first start signal line is connected to a start signal input terminal of a first stage included in a first shift register of the gate driver and a start signal input terminal of a first stage included in a second shift register of the gate driver, and the second start signal line is connected to a start signal input terminal of an Mth stage included in the first shift register of the gate driver and a start signal input terminal of an Mth stage included in the second shift register of the gate driver, M being an integer larger than or equal to 2.

5. The display apparatus of claim 4, wherein the first stage included in the first shift register of the gate driver and the first stage included in the second shift register of the gate driver are disposed at one side and the other side respectively with respect to the first display area, and the Mth stage included in the first shift register of the gate driver and the Mth stage included in the second shift register of the gate driver are disposed at one side and the other side respectively with respect to the second display area.

6. The display apparatus of claim 4, wherein stages included in the first shift register and the second shift register are implemented to have a dependent connection relationship so that an output of a next stage starts based on an output of a previous stage.

7. The display apparatus of claim 4, wherein the stages included in the first shift register and the stages included in the second shift register are connected to a same gate line for each stage and output a same gate signal.

8. The display apparatus of claim 4, wherein the first start signal is generated prior to the second start signal.

9. The display apparatus of claim 8, wherein the Mth stage included in the first shift register and the second shift register output an Mth gate signal after an Mth−1 gate signal is output from an Mth−1 stage included in the first shift register and the second shift register.

10. The display apparatus of claim 1, wherein the first start signal and the second start signal have a same phase during a power-off sequence when supply of power to the display apparatus is cut off.

11. The display apparatus of claim 1, wherein the first start signal and the second start signal have different phases during a display-on sequence when power is applied to the display panel.

12. The display apparatus of claim 1, wherein the first display area is an upper display area corresponding to upper half of the display panel, and the second display area is a lower display area corresponding to lower half of the display panel.

13. A driving method for a display apparatus, the driving method comprising:

outputting a gate signal for simultaneously and sequentially initializing gate lines of a first display area defined in a display panel and gate lines of a second display area defined in the display panel, during a power-on sequence when power is applied to the display apparatus; and sequentially applying a gate signal up to a last gate line of the second display area from a first gate line of the first display area during a display-on sequence when the power is applied to the display panel, wherein a gate driver for outputting the gate signal operates based on a first start signal and a second start signal having a same phase during the power-on sequence and outputs the gate signal.

14. The driving method of claim 13, further comprising outputting a gate signal for simultaneously and sequentially initializing the gate lines of the first display area and the gate lines of the second display area during a power-off sequence when supply of the power to the display apparatus is cut off.

15. The driving method of claim 14, wherein the gate driver for outputting the gate signal operates based on a first start signal and a second start signal having a same phase during the power-off sequence and outputs the gate signal.

16. The driving method of claim 14, wherein the gate driver for outputting the gate signal operates based on a first start signal and a second start signal having different phases during the display-on sequence.

* * * * *